(12) United States Patent
Park et al.

(10) Patent No.: US 8,031,301 B2
(45) Date of Patent: Oct. 4, 2011

(54) DISPLAY SUBSTRATE, METHOD OF MANUFACTURING THE SAME, AND LIQUID CRYSTAL DISPLAY APPARATUS HAVING THE SAME

(75) Inventors: Young-Gi Park, Shiheung-si (KR); Kee-Han Uh, Yongin-si (KR); Ji-Suk Lim, Daejeon (KR); Sun-Ja Kwon, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 496 days.

(21) Appl. No.: 12/070,753

(22) Filed: Feb. 20, 2008

(65) Prior Publication Data

US 2009/0091674 A1 Apr. 9, 2009

(30) Foreign Application Priority Data

Apr. 10, 2007 (KR) ................. 10-2007-0034853

(51) Int. Cl.
*G02F 1/1333* (2006.01)
(52) U.S. Cl. ...................... 349/110; 349/141
(58) Field of Classification Search .......... None
See application file for complete search history.

(56) References Cited

U.S. PATENT DOCUMENTS

| | | | |
|---|---|---|---|
| 6,281,953 B1 * | 8/2001 | Lee et al. | 349/43 |
| 6,485,997 B2 * | 11/2002 | Lee et al. | 438/30 |
| 7,030,953 B2 * | 4/2006 | Yanagawa et al. | 349/141 |
| 7,683,998 B2 * | 3/2010 | Lee | 349/141 |
| 2007/0002246 A1 * | 1/2007 | Chang et al. | 349/141 |
| 2007/0225096 A1 * | 9/2007 | Fujita | 474/202 |

FOREIGN PATENT DOCUMENTS

| | | |
|---|---|---|
| JP | 2002-303873 | 10/2002 |
| KR | 10-2005-0021135 | 3/2005 |
| KR | 10-2005-0081746 | 8/2005 |

OTHER PUBLICATIONS

Patent Abstracts of Japan, Publication No. 2002-303873, Oct. 18, 2002, 1 p.
Korean Patent Abstracts, Publication No. 1020050021135, Mar. 7, 2005, 1 p.
Korean Patent Abstracts, Publication No. 1020050081746, Aug. 19, 2005, 1 p.

* cited by examiner

*Primary Examiner* — Richard Kim
(74) *Attorney, Agent, or Firm* — Innovation Counsel LLP

(57) ABSTRACT

A display substrate includes a pixel, first, second and third gate lines, and a source line. The pixel includes first, second and third unit pixels, each generating a different color. The first, second and third gate lines are electrically connected to respective ones of the first, second and third unit pixels. The source line is electrically connected to each of the first, second and third unit pixels. Each of the first, second and third unit pixels includes a common electrode and a respective pixel electrode. The common electrode is formed on a substrate. The pixel electrodes are disposed over the common electrode such that the pixel electrode face the common electrode. Each of the pixel electrodes has a plurality of openings therethrough. This arrangement results in a wider display viewing angle and a reduction in the required number of source driver chips.

17 Claims, 32 Drawing Sheets

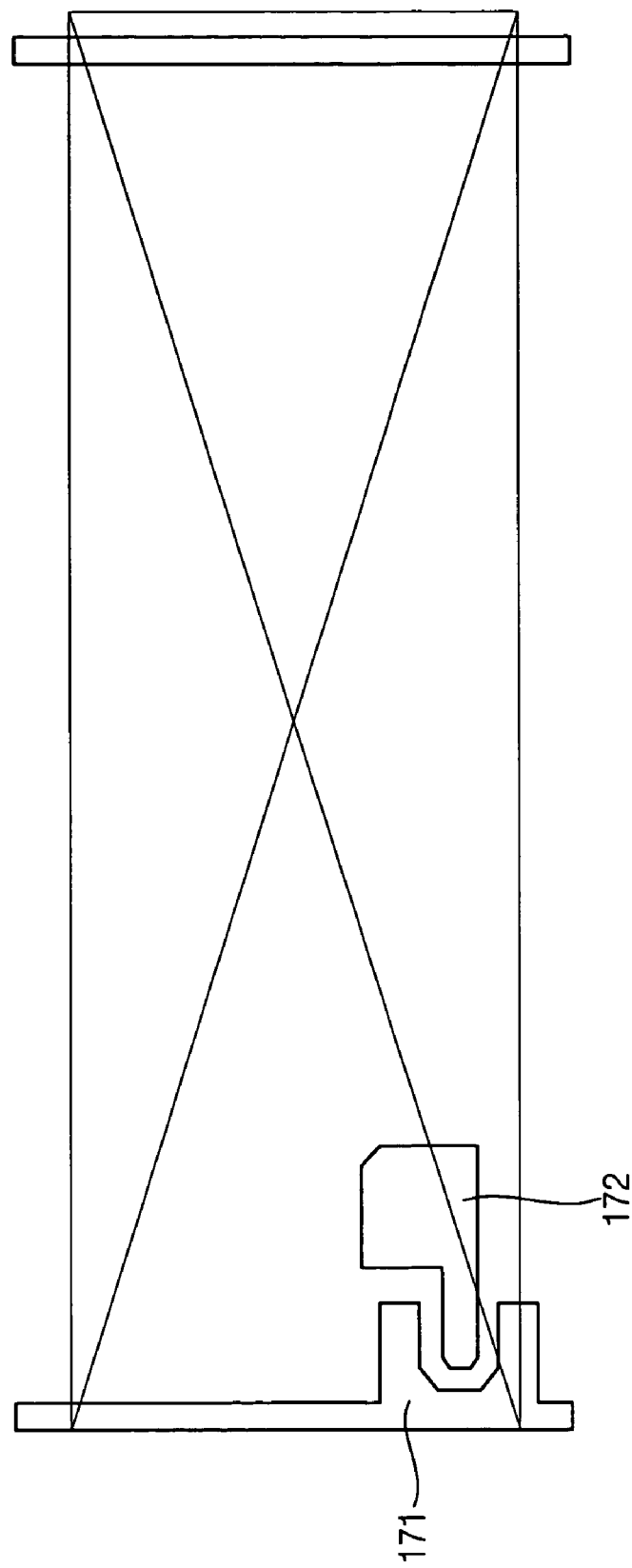

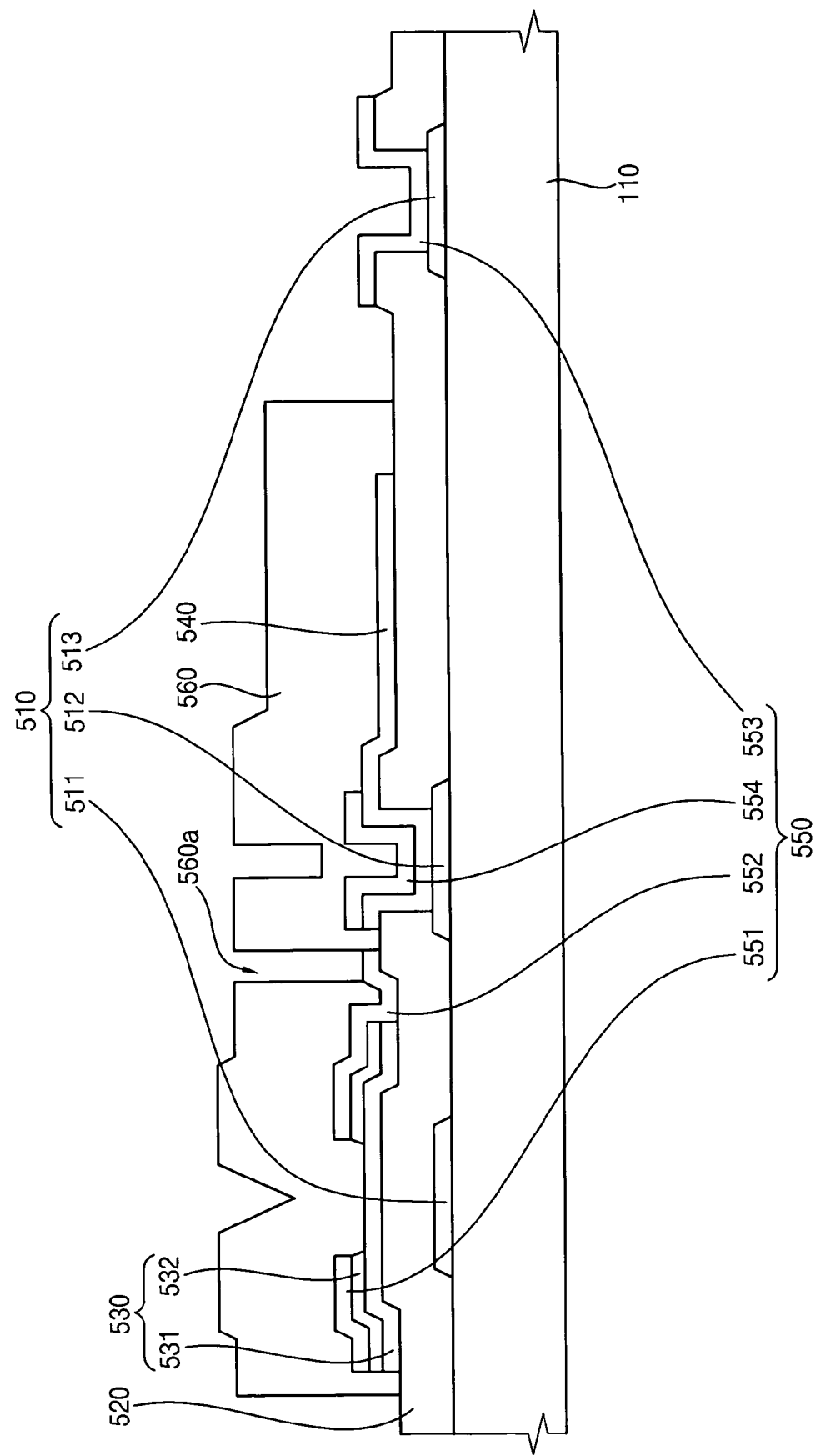

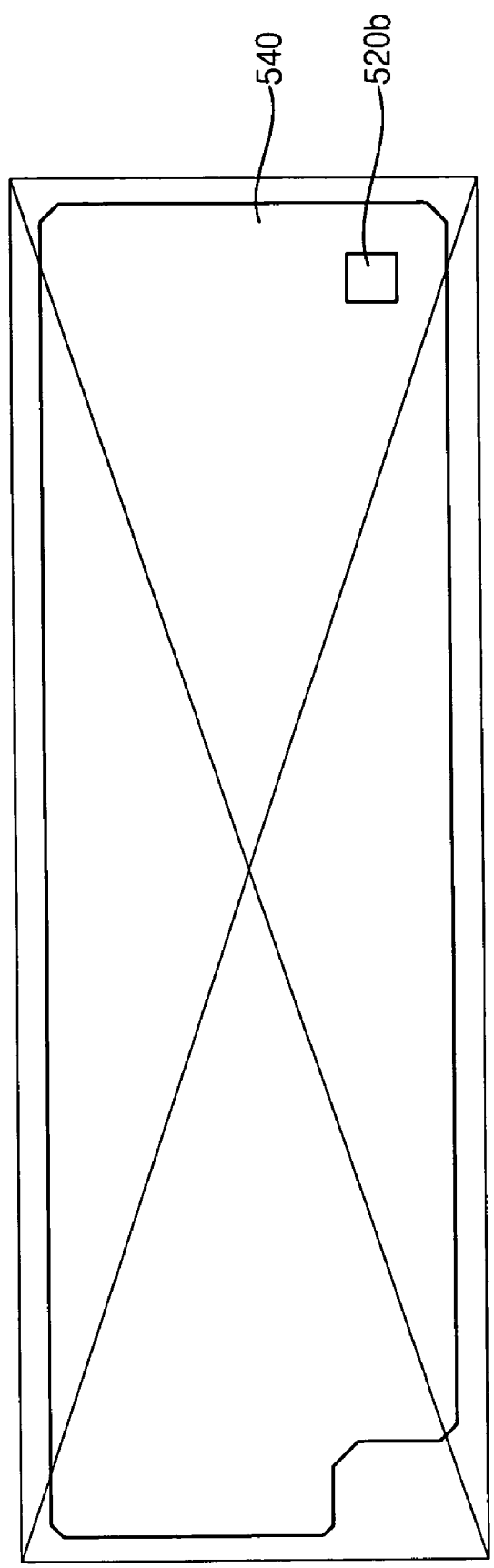

DISPLAY SUBSTRATE, METHOD OF MANUFACTURING THE SAME, AND LIQUID CRYSTAL DISPLAY APPARATUS HAVING THE SAME

RELATED APPLICATIONS

This application claims priority of Korean Patent Application No. 2007-34853, filed Apr. 10, 2007, the entire disclosure of which is incorporated herein by reference.

BACKGROUND

This disclosure relates to methods for making liquid crystal display (LCD) substrates and LCDs incorporating such substrates.

LCDs typically incorporate a display panel comprising pair of substrates having electrodes formed thereon, and a layer of a liquid crystal material interposed between the two substrates. It is desirable that such displays be visible to viewers who are situated at various angles in front of them, i.e., that they exhibit a wide viewing angle.

Various technologies have been developed for implementing wide viewing angles in LCDs. Recently, in-plane switching (IPS), fringe-field switching (FFS), and other operating modes have been developed in an effort to achieve LCDs with wider viewing angles. The basic principles of the FFS mode are similar to those of the IPS mode. However, unlike the IPS mode that uses electric fields oriented parallel to a base substrate, the FFS mode uses electric fields inclined with respect to a base substrate, which induces a twist and tilt of the molecules of the liquid crystal material, which has the property of birefringence. The FFS mode is currently under research in various fields.

SUMMARY

In accordance with the exemplary embodiments of this disclosure, display substrates that have a wide viewing angle, a reduced number of source driver chips and an increased aperture ratio are provided, as well as methods of manufacturing the substrates and LCDs incorporating them.

In one exemplary embodiment, a display substrate includes a pixel and first, second and third gate lines, and a source line. The pixel includes first, second and third unit pixels, each generating a different color. The first, second and third gate lines are respectively connected to the first, second and third unit pixels. The source line is electrically connected to each of the first, second and third unit pixels. Each of the first, second and third unit pixels includes a common electrode and a pixel electrode. The common electrode is formed on a substrate. The pixel electrode is disposed over the common electrode such that the pixel electrode faces the common electrode. The pixel electrode has a plurality of openings therethrough. Short sides of the first, second and third unit pixels are substantially parallel with the source line, and the first, second and third unit pixels are arranged along the source line. The openings of the pixel electrodes are inclined with respect to the source line and symmetric with respect to a virtual line passing through the center of the pixel electrodes.

The display substrate may further include a light-blocking pattern formed directly on the common electrode such that the light-blocking pattern covers a portion of the common electrode. The light-blocking pattern is formed at end portions of the common electrode.

The common electrode may also be formed directly on the display substrate. The display substrate may further include a reference voltage applying line formed thereon such that the reference voltage applying line is electrically connected to the common electrode.

The display substrate may further include a gate insulation layer, a semiconductor layer, a source electrode, a drain electrode and a passivation layer. The gate insulation layer may be formed on the substrate on which the first, second and third gate lines and the reference voltage applying line are formed. The semiconductor pattern may be formed on the gate insulation layer. The source electrode may protrude from the source line so as to be disposed on the semiconductor pattern. The drain electrode may be disposed on the semiconductor pattern such that the drain electrode faces the source electrode. The passivation layer may be disposed between the gate insulation layer and the pixel electrode such that the passivation layer covers the semiconductor layer, the source electrode and the drain electrode.

The display substrate may further include a reference voltage applying line. The reference voltage applying line may be formed on the display substrate. The gate insulation layer may be formed on the substrate so as to cover the first, second and third gate lines and the reference voltage applying line. The common electrode may be formed on the gate insulation layer such that the common electrode is electrically connected to the reference voltage applying line.

The display substrate may further include a semiconductor layer, a source electrode, a drain electrode and a passivation layer. The semiconductor layer may be formed on the gate insulation layer. The source electrode may protrude from the source line so as to be disposed on the semiconductor layer. The drain electrode may be disposed on the semiconductor layer such that the drain electrode faces the source electrode. The passivation layer may be disposed between the gate insulation layer and the pixel electrode such that the passivation layer covers the semiconductor layer, the source electrode, the drain electrode and the common electrode.

In another exemplary embodiment, a display substrate includes a substrate, a gate line, a source line, a switching element, a common electrode, a light-blocking pattern and a pixel electrode. The gate line extends along a first direction on the substrate. The source line extends along a second direction that is substantially perpendicular to the first direction to define a unit pixel. The switching element includes a gate electrode electrically connected to the gate line, a source electrode electrically connected to the source line, and a drain electrode. The common electrode is formed in the unit pixel. The light-blocking pattern is formed directly on the common electrode to cover a portion of the common electrode. The pixel electrode is disposed over the common electrode such that the pixel electrode faces the common electrode. The pixel electrode is electrically connected to the drain electrode of the switching element. The pixel electrode has a plurality of openings therethrough.

The display substrate may further include an alignment layer formed on the pixel electrode, and the light-blocking pattern may be formed such that the light-blocking pattern is disposed adjacent to an associated one of the gate lines and the source lines, the associated line being substantially parallel with a rubbing direction of the alignment layer.

In another exemplary embodiment, an LCD includes a first substrate, a second substrate and a layer of a liquid crystal material interposed therebetween. The second substrate faces the first substrate. The second substrate includes a gate line, a source line, a switching element, a common electrode, a light-blocking pattern and a pixel electrode. The gate line extends along a first direction. The source line extends along a second direction that is substantially perpendicular to the first direction to define a unit pixel. The switching element includes a gate electrode electrically connected to the gate line, a source electrode electrically connected to the source line, and a drain electrode. The common electrode is formed in the unit pixel. The light-blocking pattern is formed directly on the common electrode to cover a portion of the common electrode. The pixel electrode is disposed over the common electrode such that the pixel electrode faces the common electrode. The pixel electrode is electrically connected to the drain electrode of the switching element. The pixel electrode has a plurality of openings therethrough. The liquid crystal layer is disposed between the first and second substrates.

In an exemplary method for manufacturing a display substrate, the substrate may include a pixel including first, second and third unit pixels, first, second and third gate lines electrically connected to respective ones of the first, second and third unit pixels, respectively, and a source line electrically connected to each of the first, second and third unit pixels. The exemplary manufacturing method comprises forming a common electrode on a substrate. A pixel electrode is then formed over the common electrode such that the pixel electrode faces the common electrode. The pixel electrode has a plurality of through-openings. A reference voltage applying line may be formed on the substrate such that the reference voltage applying line is electrically connected to the common electrode. The reference voltage applying line and the first, second and third gate lines may be formed by first forming a metal layer on the substrate on which the common electrode is formed, then patterning the metal layer to form the reference voltage applying line and the first, second and third gate lines.

According to another exemplary method, a gate insulation layer may be formed on the substrate on which the reference voltage applying line and the first, second and third gate lines are formed. A semiconductor pattern may be formed on the gate insulation layer. A source electrode protruding from the source line, and a drain electrode disposed adjacent to the source electrode may be formed on the semiconductor layer. A passivation layer may then be formed between the gate insulation layer and the pixel electrode. The passivation layer may be formed so as to cover the semiconductor layer, the source and drain electrodes.

The display substrate may further include a reference voltage applying line. In another exemplary method, a metal layer is first formed on the substrate and then patterned to form the first, second and third gate lines and the reference voltage applying lines.

In another exemplary method, a gate insulation layer may be formed on a substrate on which first, second and third gate lines and a reference voltage applying lines are formed. A common electrode is then formed on the gate insulation layer.

In another exemplary method, a semiconductor pattern may be formed on the gate insulation layer. A source electrode protruding from a source line, and a drain electrode disposed adjacent to the source electrode may be formed on the semiconductor pattern. A passivation layer may then be formed between the gate insulation layer and a pixel electrode such that the passivation layer covers the semiconductor layer, the source electrode, the drain electrode and the common electrode.

In accordance with the exemplary embodiments disclosed herein, the viewing angles of LCDs are widened, the number of source driver chips is reduced, and the aperture ratios of the LCDs are enhanced. A better understanding of the above and many other features and advantages of the novel LCD substrates and manufacturing methods of the present invention may be obtained from a consideration of the detailed description below of some exemplary embodiments thereof, particularly if such consideration is made in conjunction with the appended drawings, wherein like reference numerals are used to identify like elements illustrated in one or more of the figures thereof.

BRIEF DESCRIPTION OF THE DRAWINGS

FIGS. 4A to 4F are top plan views of the exemplary display substrate of FIGS. 3A to 3G, respectively, showing the successive stages of the manufacture thereof;

FIGS. 6A to 6G are partial cross-sectional views of the display substrate of FIG. 5, showing successive stages in an exemplary embodiment of a method for manufacturing the substrate;

FIGS. 7A to 7G are top plan views of the exemplary substrate of FIGS. 6A to 6G, respectively, showing the successive stages of the manufacture thereof;

DETAILED DESCRIPTION

Figure 1:
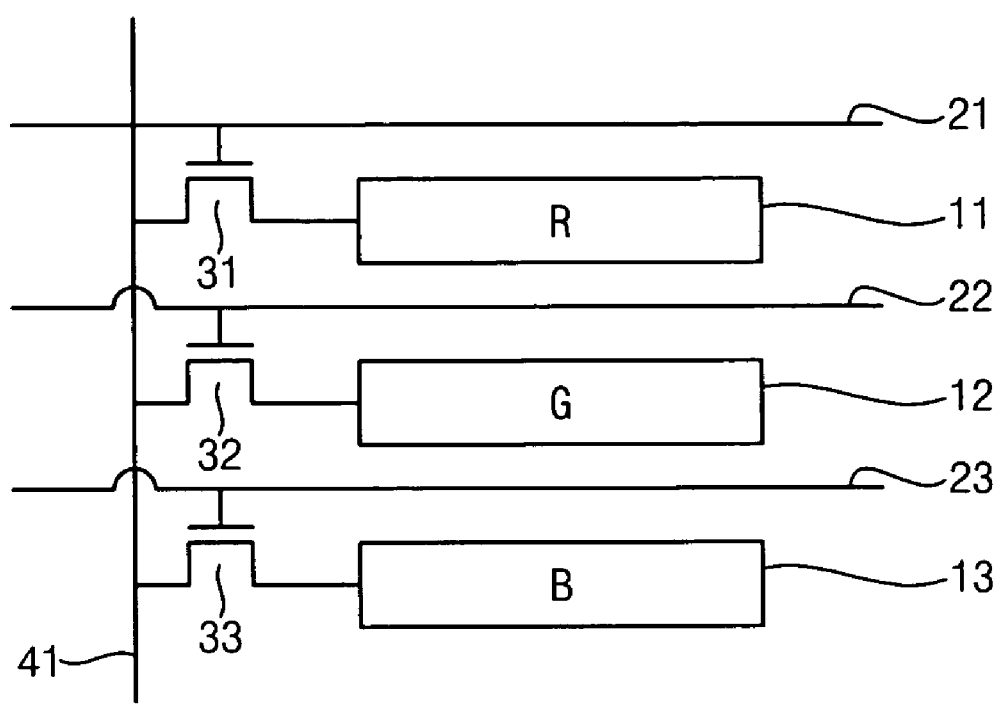
FIG. 1 is a schematic diagram of a group of three unit pixels of an exemplary embodiment of an LCD display substrate in accordance with the present invention.

This invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a schematic diagram of a group of three unit pixels of an exemplary embodiment of an LCD display substrate 10 in accordance with the present invention.

Referring to FIG. 1, the exemplary display substrate 10 includes a plurality of pixels arranged in a matrix shape. Each of the pixels includes a group of three adjacent unit pixels, a first unit pixel 11, a second unit pixel 12 and a third unit pixel 13. In one example, the first unit pixel 11 may correspond to a red unit pixel, the second unit pixel 12 to a green unit pixel and the third unit pixel 13 to a blue unit pixel.

The first, second and third unit pixels 11, 12 and 13 are electrically connected to a single source line 41 through first, second and third switching element 31, 32 and 33, respectively. The first, second and third switching elements 31, 32 and 33 have a W/L ratio that is about three times larger than that of conventional switching elements of conventional display substrates that have first, second and third unit pixels electrically connected to the same gate line and to different source lines, respectively, wherein 'W' is a channel width and 'L' is a channel length. Therefore, the time required for electrically charging the liquid crystal capacitor defined by respective ones of the first, second and third unit pixels 11, 12 and 13 is reduced, because each of the first, second and third unit pixels 11, 12 and 13 are electrically connected to the same source line 41. However, the reduced time for electrically charging the liquid crystal capacitors of the unit pixels is compensated for by increasing the size of the first, second and third switching elements 31, 32 and 33 relative to those of the conventional display.

Gate electrodes of the first, second and third switching elements 31, 32 and 33 are electrically connected to first, second and third gate lines 21, 22 and 23, respectively.

The first, second and third unit pixels 11, 12 and 13 may have, for example, a rectangular shape, and may be arranged such that a short side of the first, second and third unit pixels 11, 12 and 13 is disposed substantially parallel with the associated source line 41, as illustrated schematically in FIG. 1.

The exemplary first, second and third unit pixels 11, 12 and 13 are driven by the first, second and third gate lines 21, 22 and 23, respectively, so that the number of gate drivers (not illustrated) is increased, but on the other hand, the first, second and third unit pixels 11, 12 and 13 are driven by the same source line 41, so that the number of the source drivers (not illustrated) is decreased.

The structure of the unit pixels 11, 12 and 13 of the exemplary substrate 10 are described in detail below in connection with FIG. 2, which is a top plan view an exemplary unit pixel of the display substrate of FIG. 1. FIGS. 3A to 3G are partial cross-sectional views of the display substrate of FIG. 2, showing successive stages in an exemplary embodiment of a method for manufacturing the substrate, and FIGS. 4A to 4F are top plan views of the display substrate of FIGS. 3A to 3G, respectively, showing successive stages in the manufacture thereof.

Figure 2:
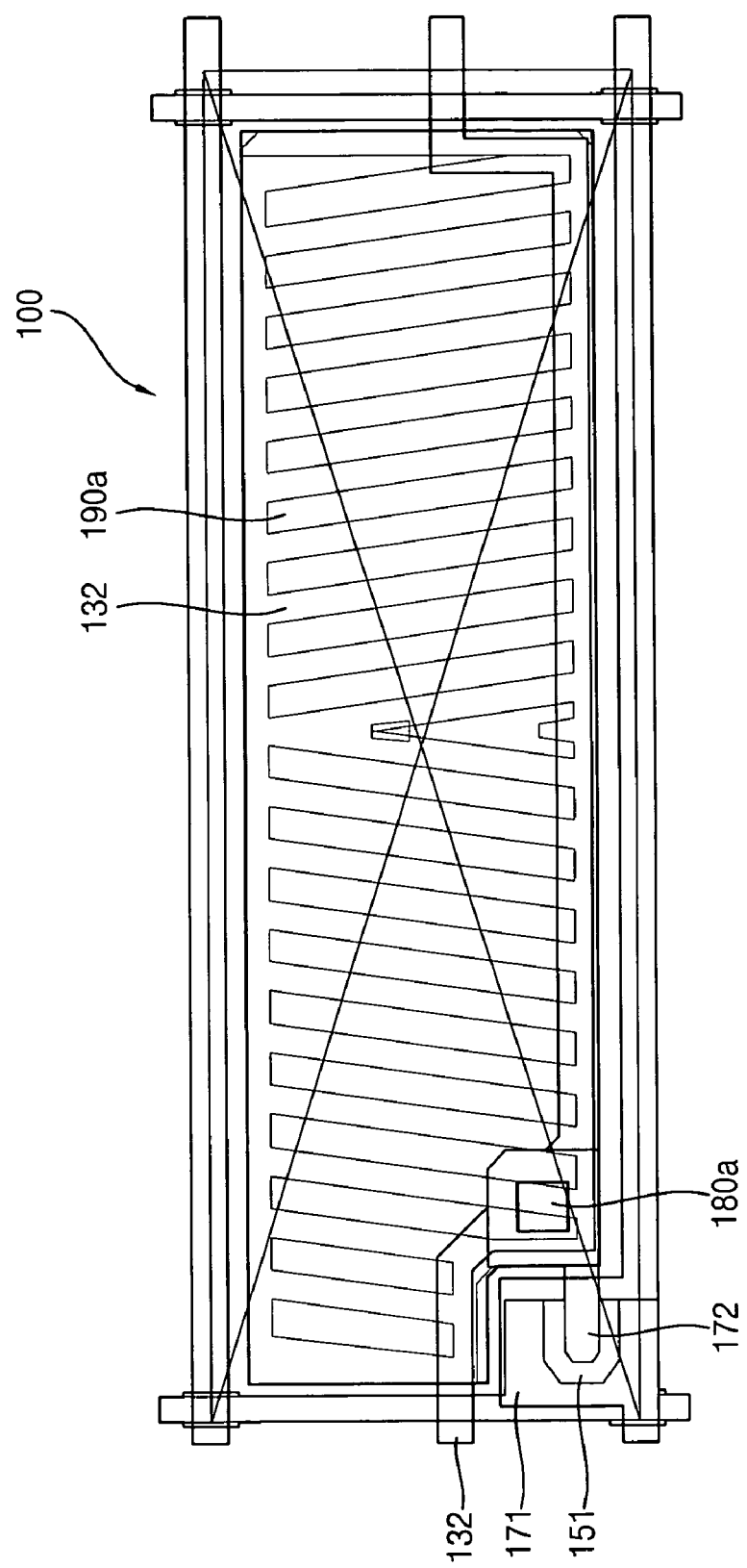
FIG. 2 is a top plan view of the display substrate of FIG. 1, showing a single exemplary unit pixel thereof.
Figure 3A:
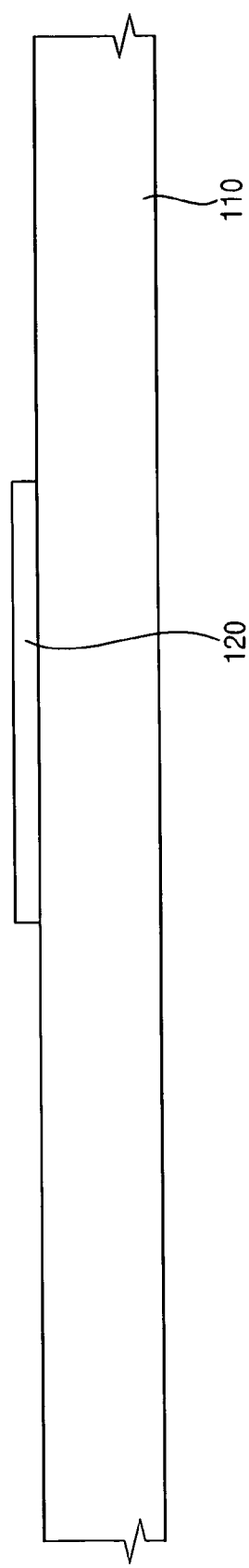
FIGS. 3A to 3G are partial cross-sectional views of the display substrate of FIG. 2, showing successive stages in an exemplary embodiment of a method for manufacturing the substrate.
Figure 3B:
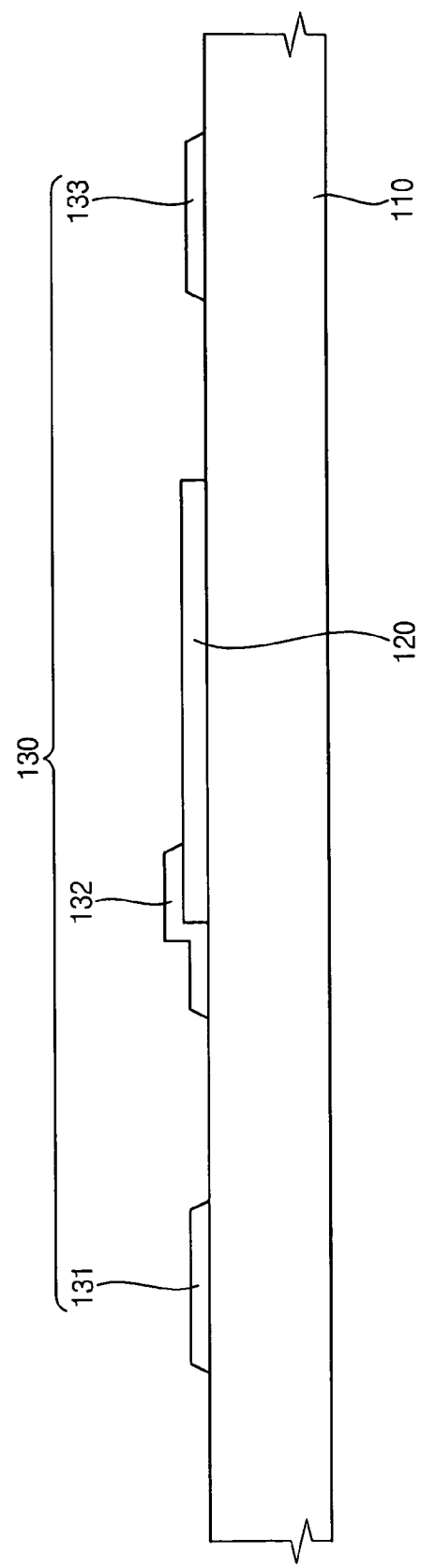
Figure 3C:
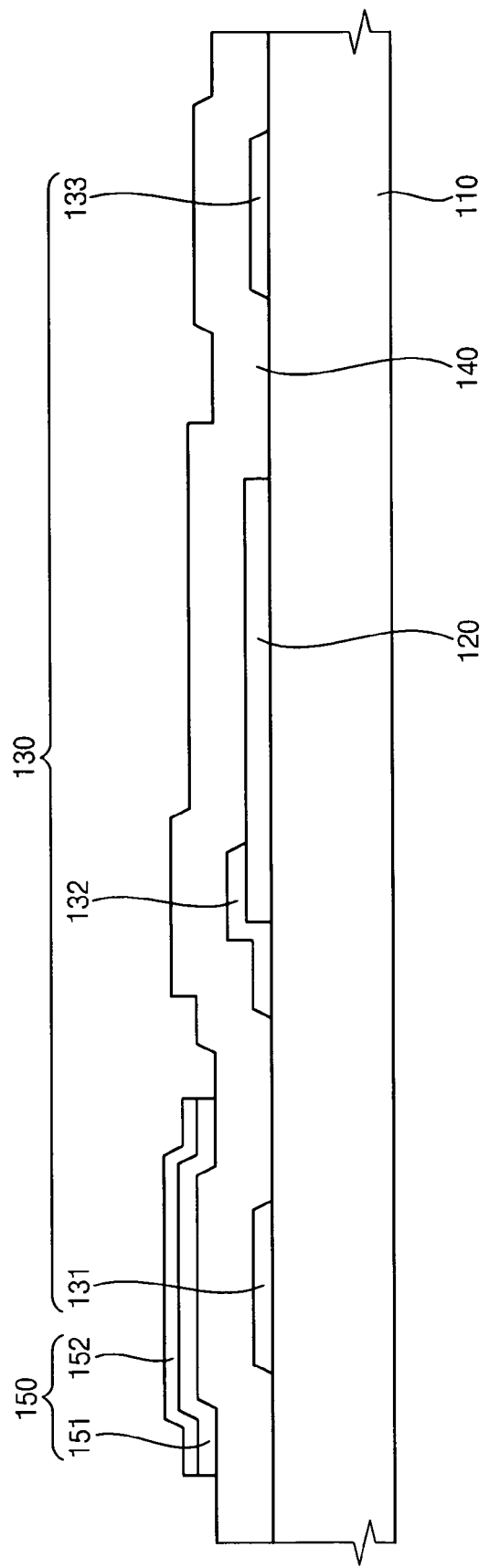
Figure 3D:
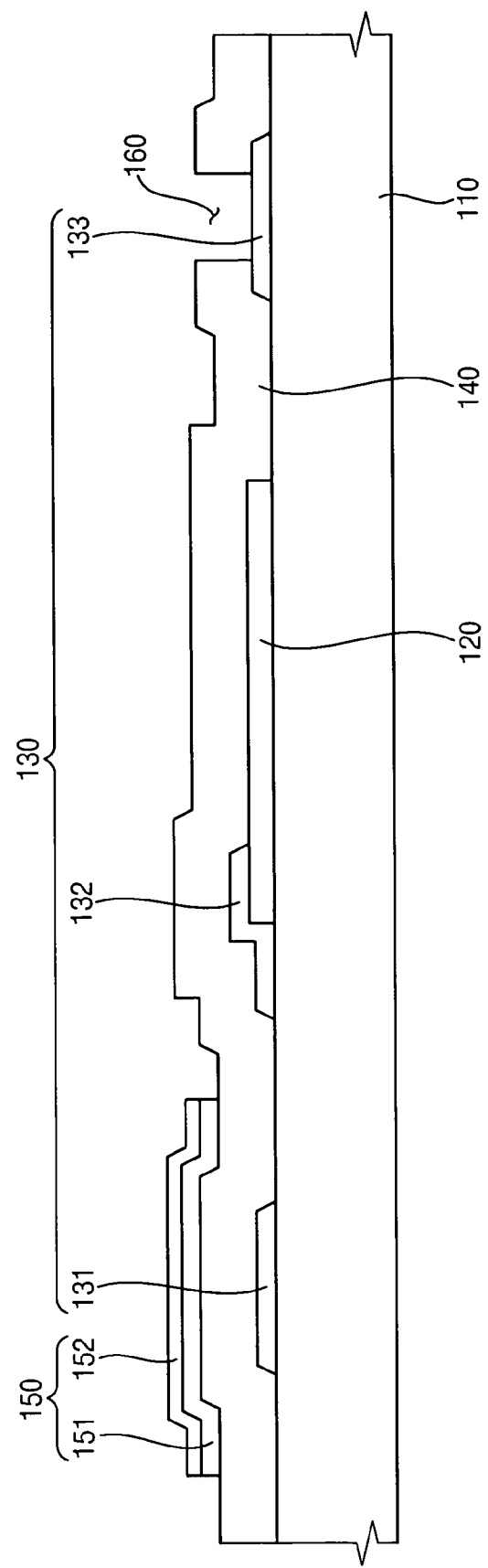
Figure 3E:
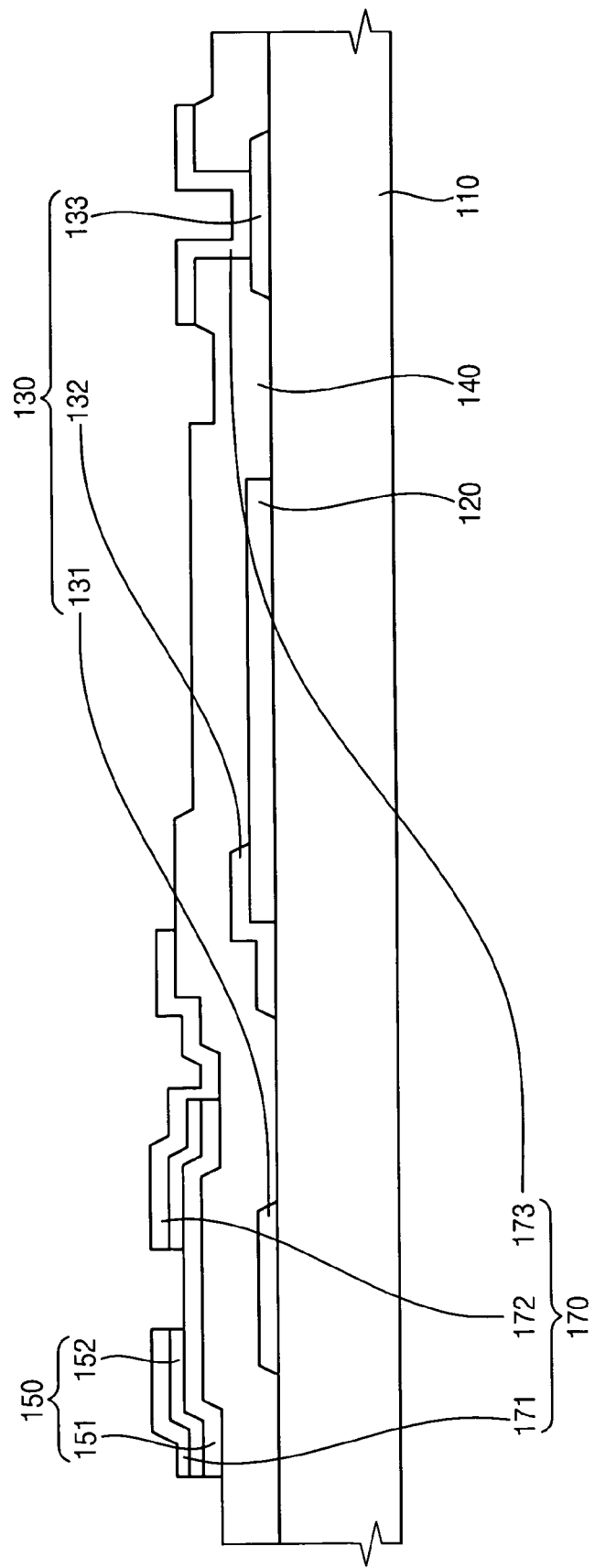
Figure 3F:
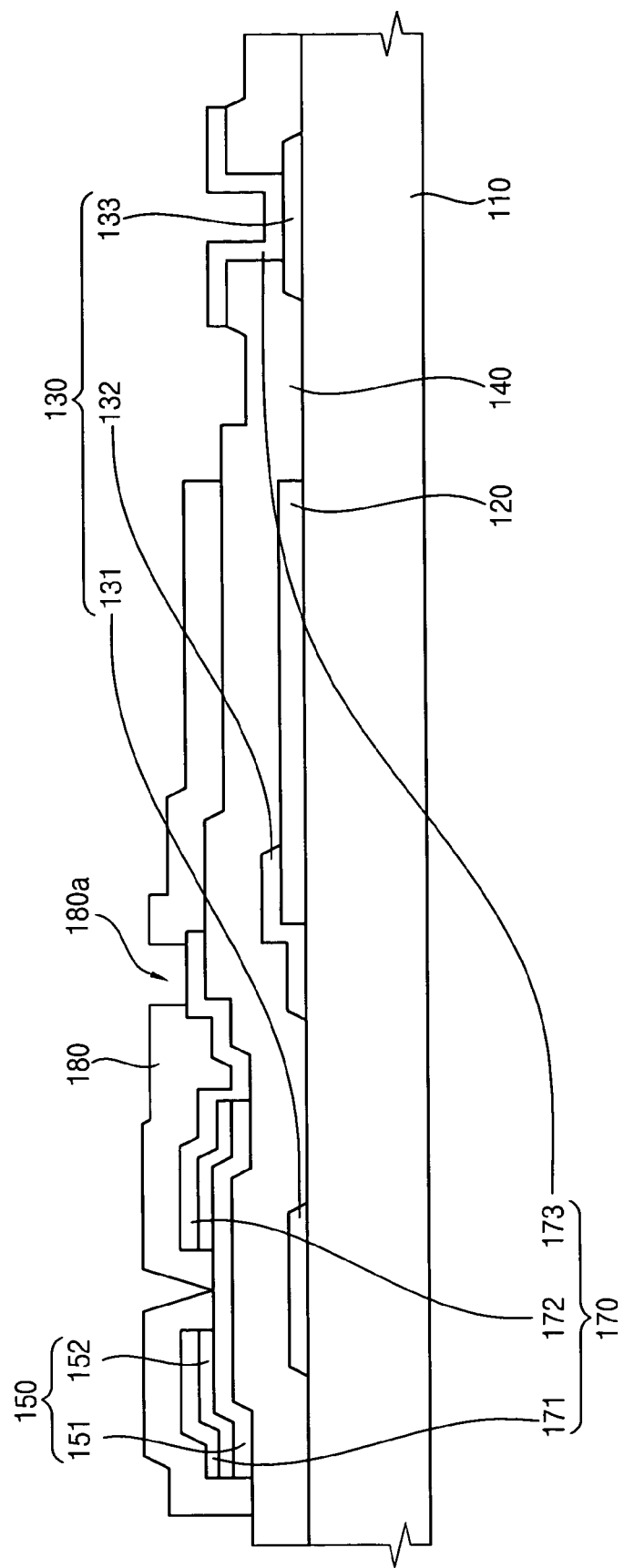
Figure 3G:
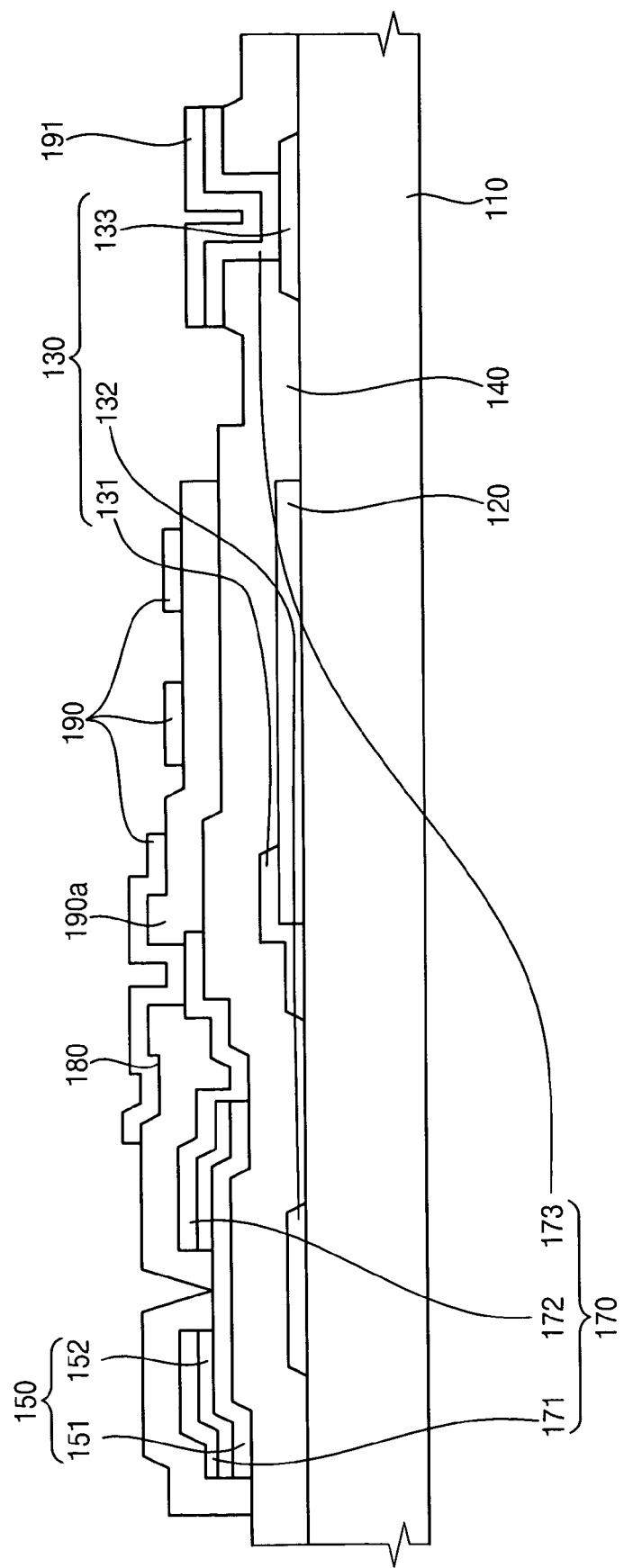

Referring to FIGS. 2 to 3G, each of the unit pixels 100 of the display substrate includes a substrate 110, a common electrode 120, a gate pattern 130, a gate insulation layer 140, a semiconductor pattern 150, a source pattern 170, a passivation layer 180 and a pixel electrode 190.

As illustrated in FIG. 3A, the common electrode 120 is first formed on the substrate 110. The common electrode 120 includes an optically transparent and electrically conductive material. For example, the common electrode 120 may include indium tin oxide (ITO), indium zinc oxide (IZO), amorphous indium tin oxide (a-ITO), or the like.

As illustrated in FIG. 3B, the gate pattern 130 is formed on the substrate 110. The gate pattern 130 includes a gate electrode 131, a reference voltage applying line 132 and a gate pad 133. The reference voltage applying line 132 is electrically connected to the common electrode 120 so as to apply a reference voltage to the common electrode 120.

As illustrated in FIG. 3C, the gate insulation layer 140 is formed on the substrate 110 on which the common electrode 120 and the gate pattern 130 were formed. The gate insulation layer 140 may include, for example, silicon nitride (SiNx), silicon oxide (SiOx), or the like. The gate insulation layer 140 has a first contact hole 160 exposing the gate pad 133.

As illustrated in FIG. 3D, the semiconductor pattern 150 is formed on the gate insulation layer 140. The semiconductor pattern 150 is disposed over the gate electrode 131. The semiconductor pattern 150 includes an activation pattern 151 and an ohmic contact pattern 152. The activation pattern 151 may include, for example, amorphous silicon, and the ohmic contact pattern 152 may include, for example, amorphous silicon with an n-type dopant in a high concentration.

As illustrated in FIG. 3E, the source pattern 170 is formed on the substrate 110 on which the semiconductor pattern 150 was formed. The source pattern 170 includes a source electrode 171, a drain electrode 172 and a first cover pattern 173. The source electrode 171 and the drain electrode 172 are separated from each other, and disposed over on the semiconductor pattern 150. The area of the ohmic contact pattern 152 between the source and drain electrodes 171 and 172 is removed, so that the activation pattern 151 is exposed between the source and drain electrodes 171 and 172. The first cover pattern 173 is electrically connected to the gate pad 133 through the first contact hole 160.

As illustrated in FIG. 3F, the passivation layer 180 is formed on the substrate 110 on which the source pattern 170 was formed. The passivation layer 180 has a second contact hole 180a exposing a portion of the drain electrode 172. The passivation layer 180 may include, for example, silicon nitride (SiNx), silicon oxide (SiOx), or the like.

As illustrated in FIG. 3G, the pixel electrode 190 is formed on the passivation layer 180. The pixel electrode 190 includes an optically transparent and electrically conductive material, for example, ITO, IZO, a-ITO, or the like.

As illustrated in FIG. 2, the pixel electrode 190 has a plurality of openings 190a. The openings 190a are formed such that the openings 190a are inclined with respect to the source line and symmetric with respect to a virtual line substantially parallel with the source line and passing through the center of the pixel electrode 190.

An alignment layer (not illustrated) for initially aligning liquid crystal molecules may be formed on the pixel electrode 190. The rubbing directions of two regions of the alignment layer, which are separated from each other by the virtual line described above, are oriented opposite to each other and substantially parallel with the source line.

As a result of the foregoing arrangement, when no pixel voltage is applied to the pixel electrode 190, the molecules of a liquid crystal material that make contact with the alignment layer are aligned along the respective rubbing directions of the alignment layer. However, when a pixel voltage is applied to the pixel electrode 190, the liquid crystal molecules rotate along a fringe electric field passing through the openings 190a.

When the rubbing directions of the alignment layer are oriented in opposite directions on opposite sides of the virtual line substantially parallel with the source line and passing through the center of the pixel electrode 190 as described above, the viewing angle of the unit pixel, and hence, the entire LCD, is enhanced.

An exemplary embodiment of a method for manufacturing the display substrate of FIG. 2 is described below with reference to FIGS. 3A to 4F. An optically transparent and electrically conductive layer (not illustrated), including ITO, IZO, a-ITO, or the like, is first formed on the substrate 110. The optically transparent and electrically conductive layer may be formed, for example, by a sputtering method.

A photoresist film is then formed on the optically transparent and electrically conductive layer. The photoresist film may include a positive type photoresist in which exposed regions are dissolved by a developer. The photoresist film is exposed and developed to form a photoresist pattern (not illustrated). Using the photoresist pattern as a mask, the optically transparent and electrically conductive layer is then patterned to form the common electrode 120.

Figure 4A:
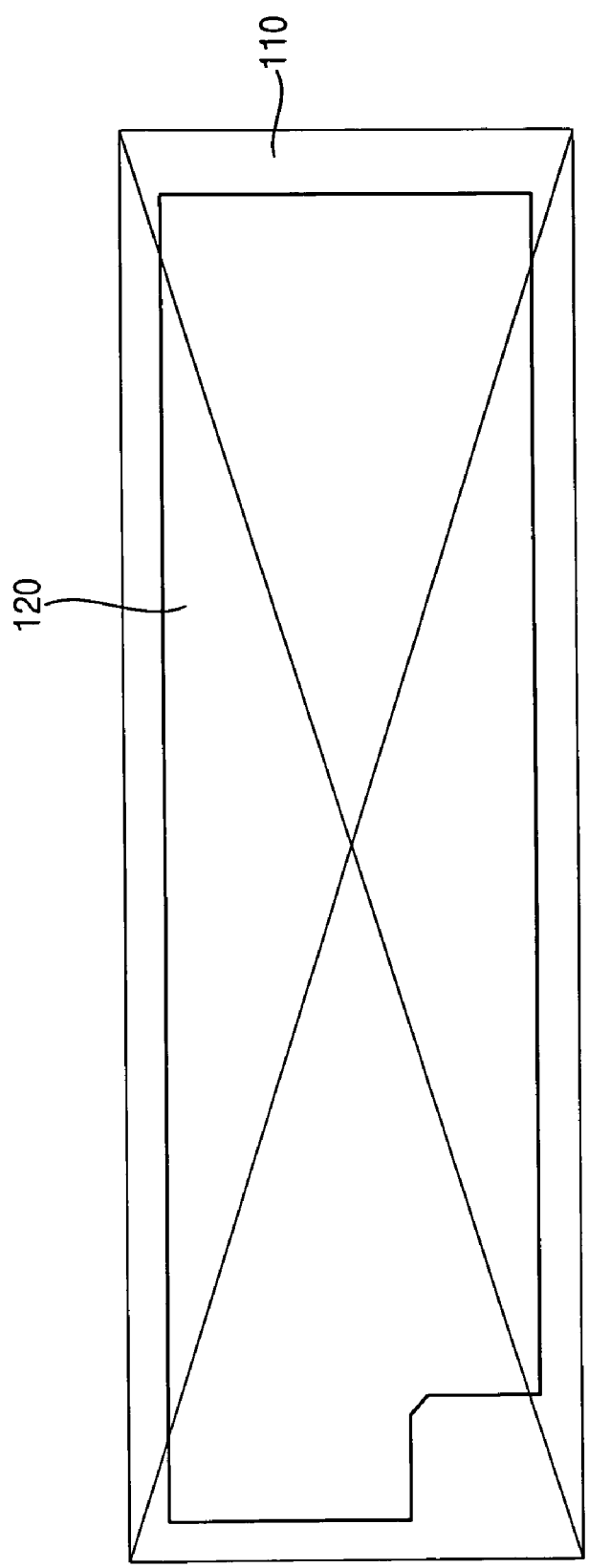
Figure 4B:
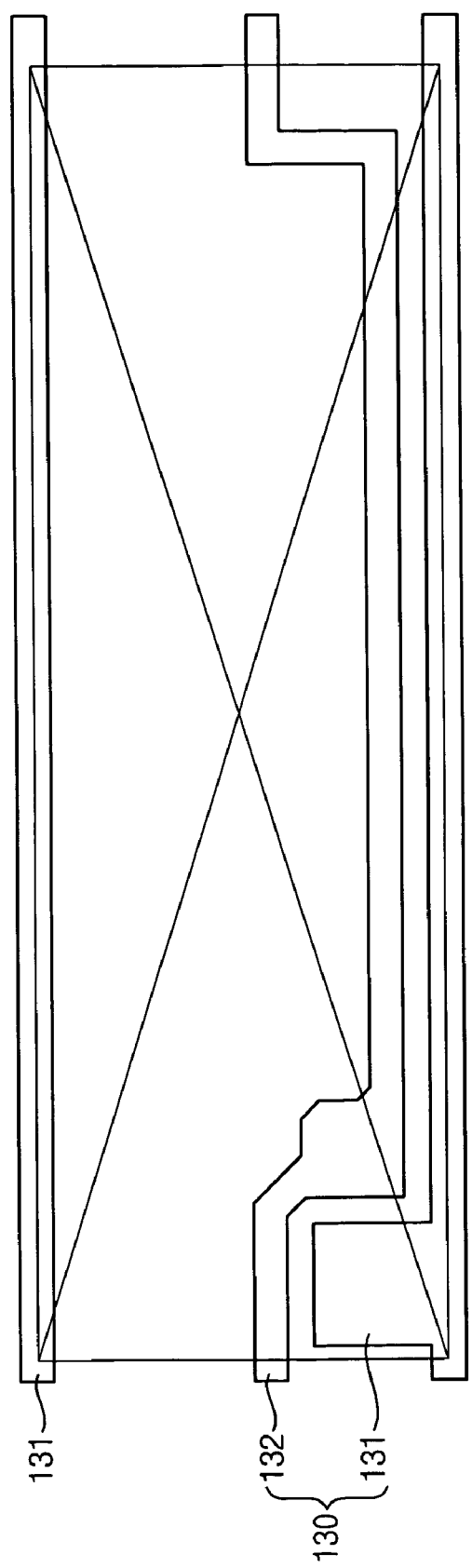

Referring to FIGS. 3B and 4B, a first metal layer (not illustrated) is formed on the substrate 110 on which the common electrode 120 was formed. The first metal layer may include, for example, chromium (Cr), aluminum (Al), tantalum (Ta), molybdenum (Mo), titanium (Ti), tungsten (W), copper (Cu), silver (Ag) or alloys thereof. The first metal layer may be formed through, for example, a sputtering method. The first metal layer may have two layers, each having different physical and chemical characteristics.

A photoresist film is then formed on the first metal layer. The photoresist film may include a positive type photoresist in which exposed regions are dissolved by a developer. The photoresist film is patterned to form a photoresist pattern using a mask, and the first metal layer is patterned using the photoresist film as a mask to form the gate line, the gate electrode 131 protruding from the gate line, the reference voltage applying line 132 and the gate pad 133. A portion of the reference voltage applying line 132 overlaps the common electrode 120 so as to make electrical contact therewith.

Figure 4C:
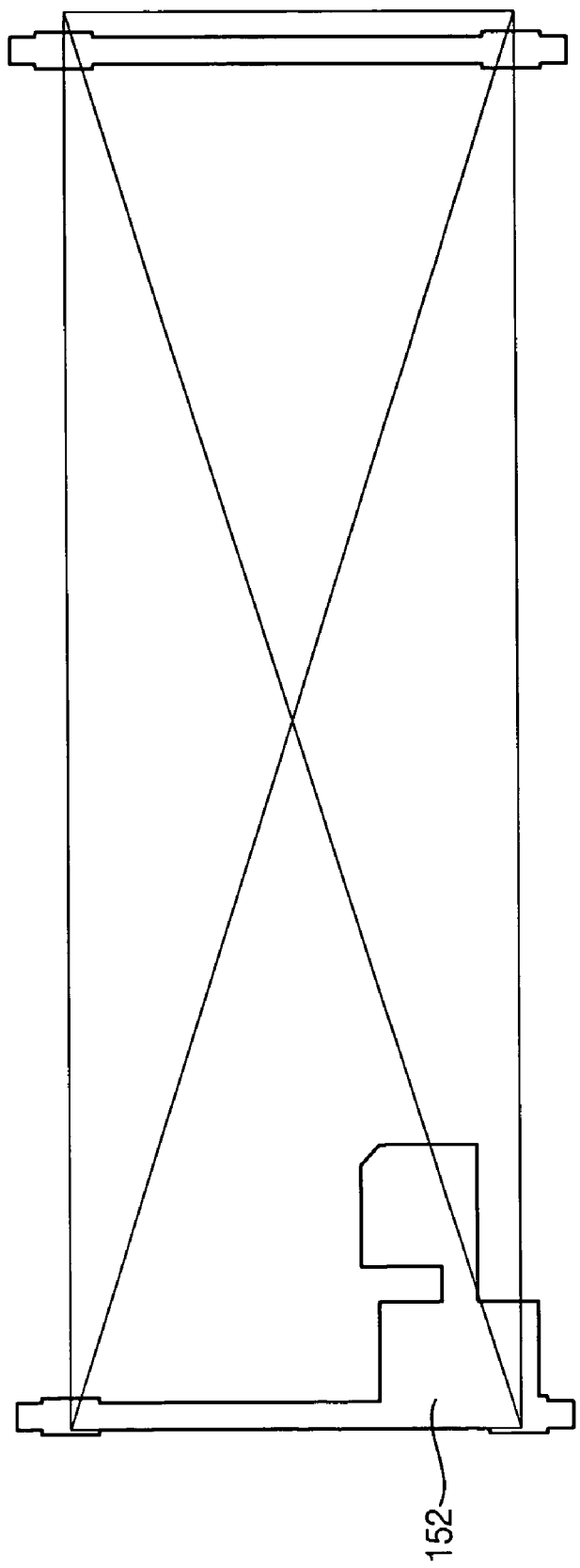

Referring to FIGS. 3C and 4C, the gate insulation layer 140 is formed on the substrate 110 on which the gate line, the gate electrode 131 protruding from the gate line, the reference voltage applying line 132 and the gate pad 133 were previously formed. The gate insulation layer 140 may be formed through, for example, a chemical vapor deposition (CVD) method. The gate insulation layer 140 may include, for example, silicon nitride (SiNx), silicon oxide (SiOx), or similar materials. The gate insulation layer 140 may have a multilayered structure, each layer formed through a different process and having different characteristics than the others.

An activation layer (not illustrated) and an ohmic contact layer (not illustrated) are then sequentially formed on the gate insulation layer 140 through, for example, the CVD method.

The activation layer may include, for example, amorphous silicon, and the ohmic contact layer may include, for example, amorphous silicon having an n-type dopant in a high concentration.

Then, a photoresist pattern is formed through a photolithography method, and the activation pattern 151 and the ohmic contact pattern 152 are formed using the photoresist pattern as a mask.

Referring to FIG. 3D, the first contact hole 160 exposing the gate pad 133 is formed through the gate insulation layer 140.

Referring to FIGS. 3E and 4D, a second metal layer (not illustrated) is formed on the substrate 110 on which the activation pattern 151 and the ohmic contact pattern 152 were formed. The second metal layer includes, for example, chromium (Cr), aluminum (Al), tantalum (Ta), molybdenum (Mo), titanium (Ti), tungsten (W), copper (Cu), silver (Ag) and alloys thereof. The first metal layer may be formed through, for example, a sputtering method. The first metal layer may have two layers, each having different physical and chemical characteristics than the other.

A photoresist film is then formed on the second metal layer, and the photoresist film is patterned to form a photoresist pattern using a photolithography method. Then, using the photoresist pattern as a mask, the second metal layer is patterned to form the source line, the source electrode 171, the drain electrode 172 and the first cover pattern 173.

The source electrode 171 protrudes from the source line, and a portion thereof overlaps the ohmic contact pattern 152. The drain electrode 172 is separated from the source electrode 171, and a portion of the drain electrode 172 overlaps the ohmic contact pattern 152. The first cover pattern 173 is formed so as to correspond to the first contact hole 160.

The area of the ohmic contact pattern 152 formed between the source and drain electrodes 171 and 172 is removed to expose the activation pattern 151 using the source and drain electrodes 171 and 172 as a mask.

Figure 4E:
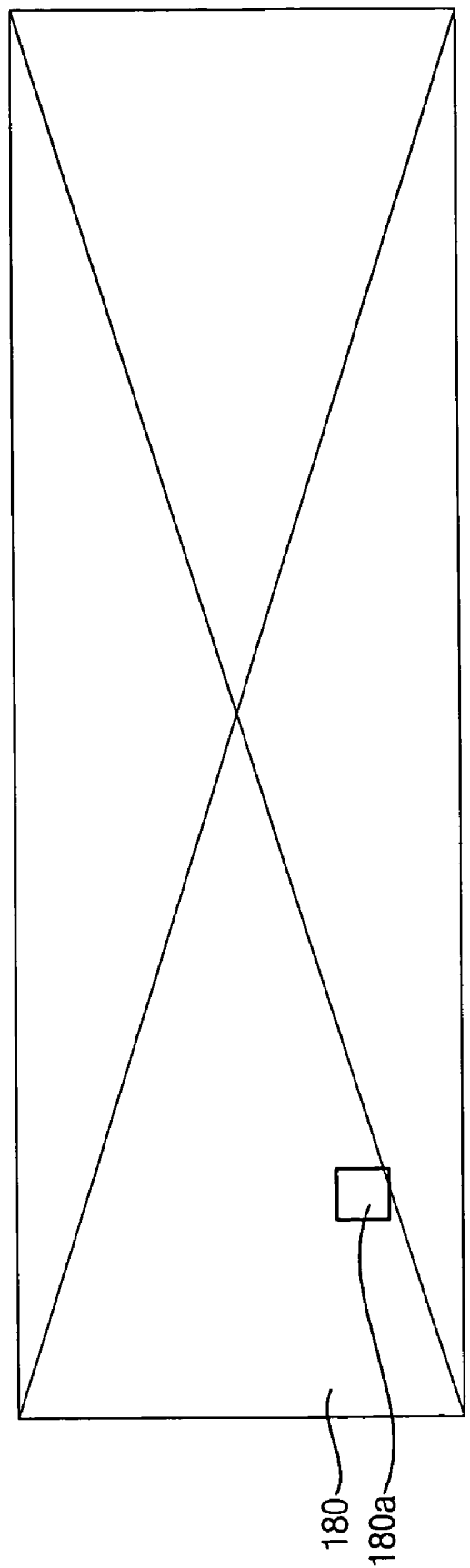

Referring to FIGS. 3F and 4E, the passivation layer 180 is formed on the substrate 110 on which a switching element, defined by the source electrode 171, the drain electrode 172, the semiconductor pattern 150 and the gate electrode 131, was formed. The passivation layer may include, for example, silicon nitride (SiNx), silicon oxide (SiOx), or the like. The passivation layer may be formed through the CVD method.

A photoresist film is then formed on the passivation layer 180, and the photoresist film is patterned through a photolithography method to form a photoresist pattern. Using the photoresist pattern, the second contact hole 180a exposing a portion of the drain electrode 172, and another hole (not illustrated) exposing an end portion of the data line, are then formed.

Figure 4F:
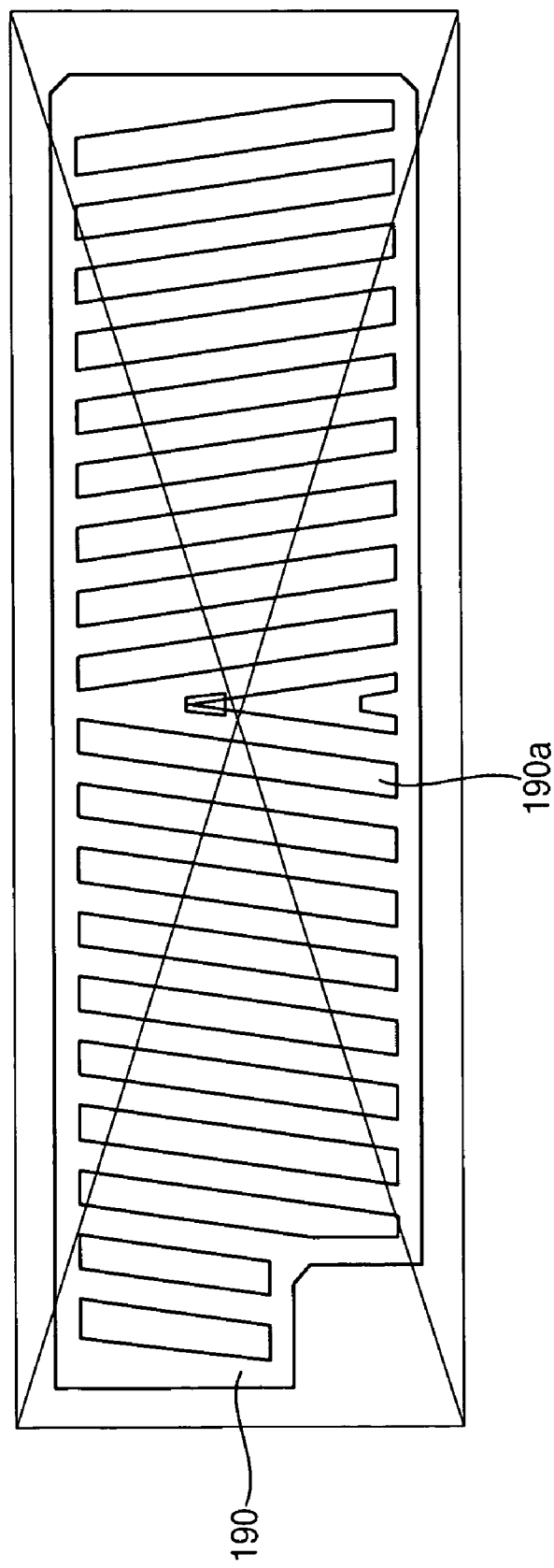

Referring to FIGS. 3G and 4F, a pixel electrode layer (not shown) is formed on the passivation layer 160. The pixel electrode layer includes, for example, ITO, IZO, a-ITO, or the like, and may be formed through a sputtering method.

The pixel electrode layer is then patterned through a photolithography method to form the pixel electrode 190.

The pixel electrode 190 includes a plurality of openings 190a. As described above, the openings 190a are formed such that the openings 190a are inclined at an angle with respect to the source line and symmetric with respect to a virtual line substantially parallel with the source line and passing through the center of the pixel electrode 190.

Additionally, the second cover pattern 191 covering the first cover pattern 173 may be formed through the same method used to form the pixel electrode.

Figure 5:
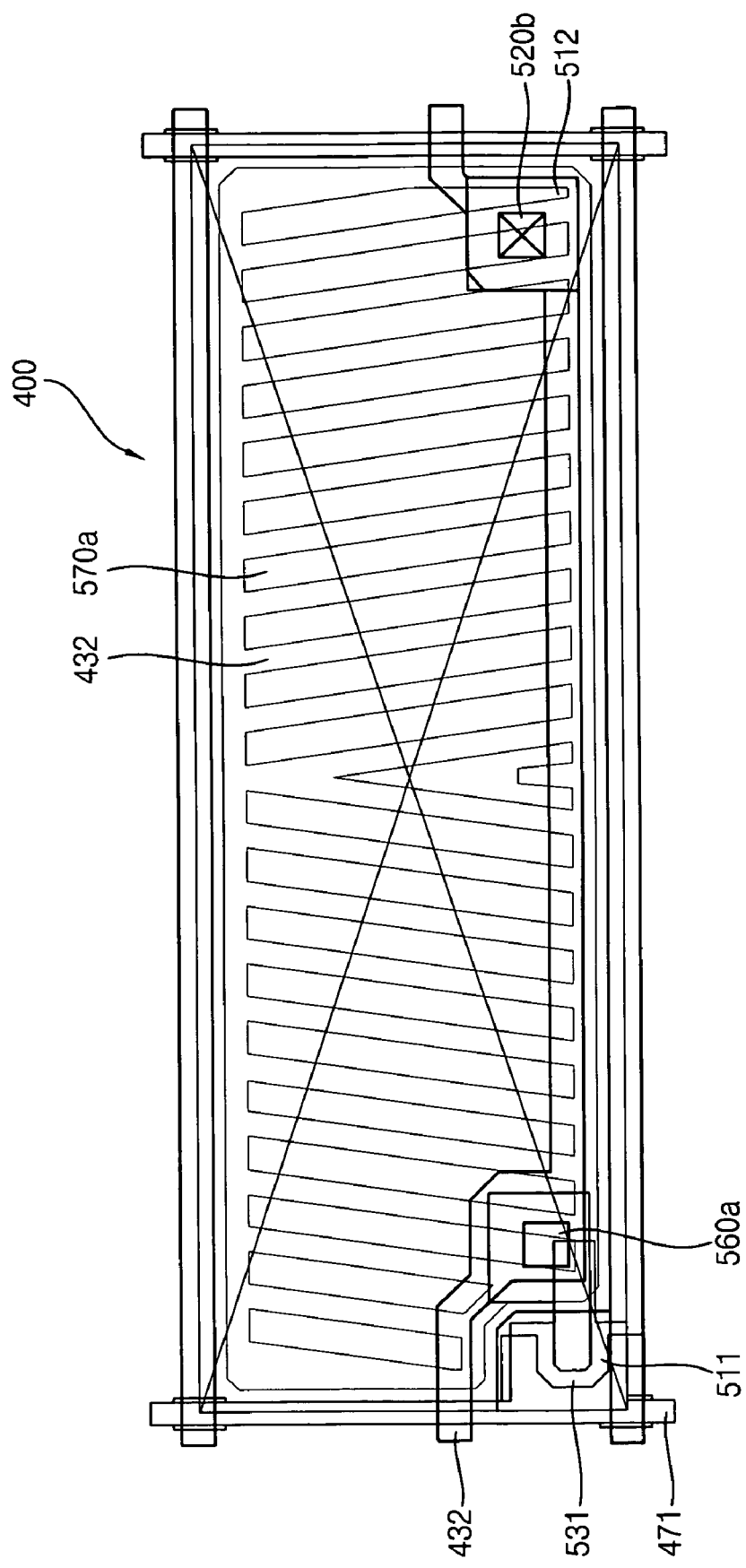
FIG. 5 is a top plan view of another exemplary embodiment of an LCD display substrate in accordance with the present invention, showing a single exemplary unit pixel area thereof.

FIG. 5 is a top plan view of another exemplary embodiment of an LCD display substrate in accordance with the present invention, showing an exemplary unit pixel area 400 thereof. FIGS. 6A to 6G are partial cross-sectional views of the display substrate of FIG. 5, showing successive stages in an exemplary embodiment of a method for manufacturing the substrate, and FIGS. 7A to 7G are top plan views of the exemplary display substrate of FIGS. 6A to 6G, respectively, showing the successive stages of the manufacture thereof.

Figure 6A:
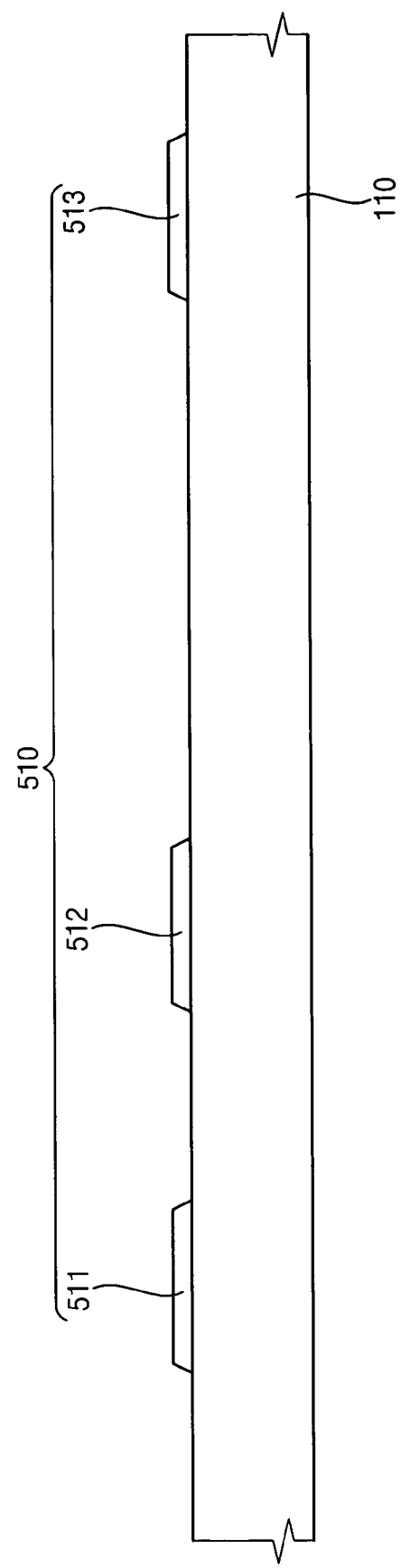
Figure 6B:
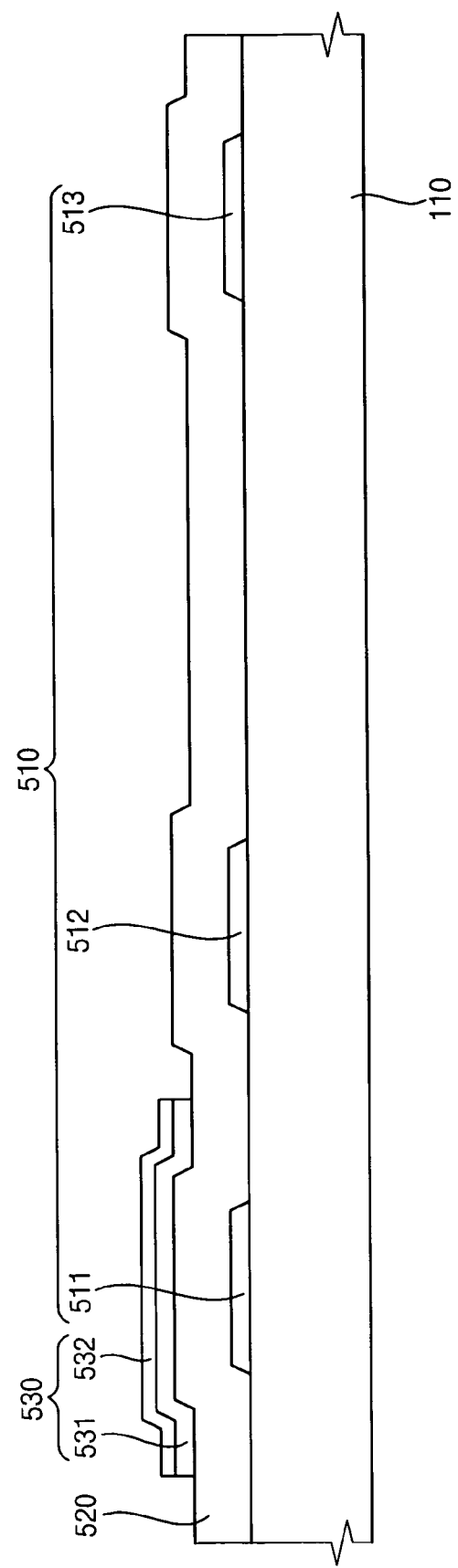
Figure 6C:
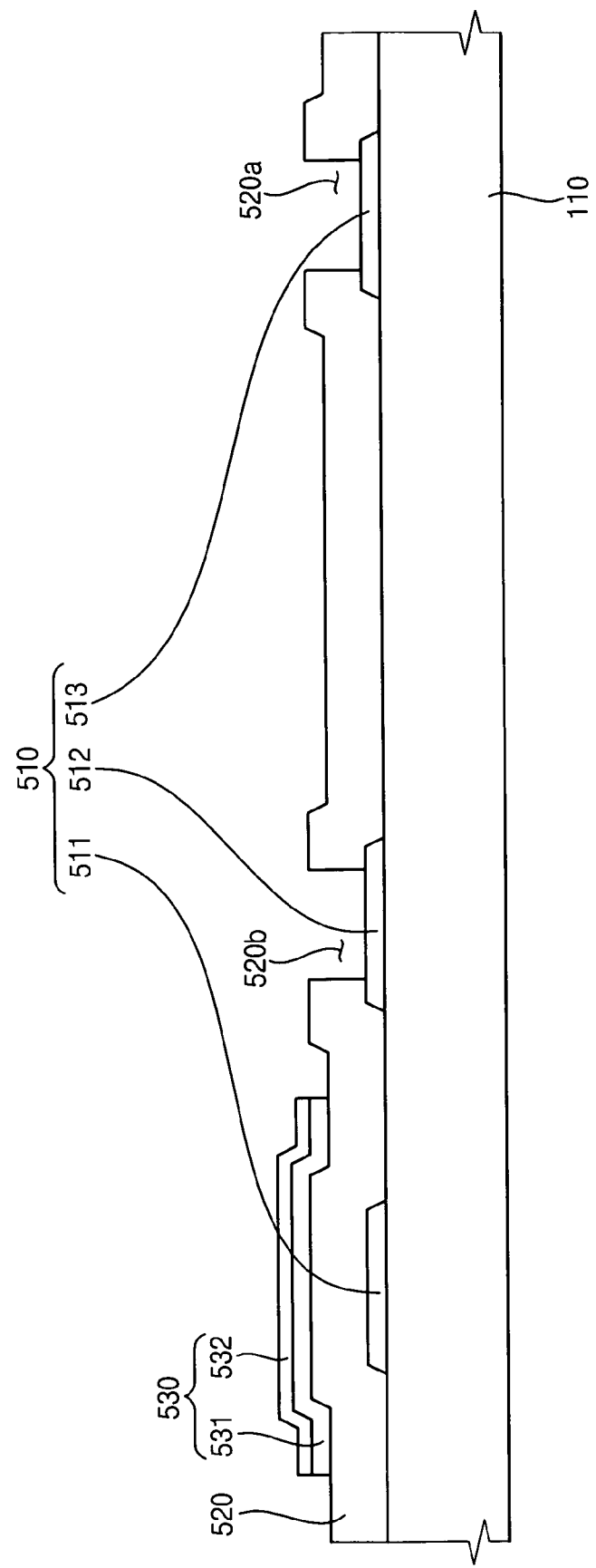
Figure 6D:
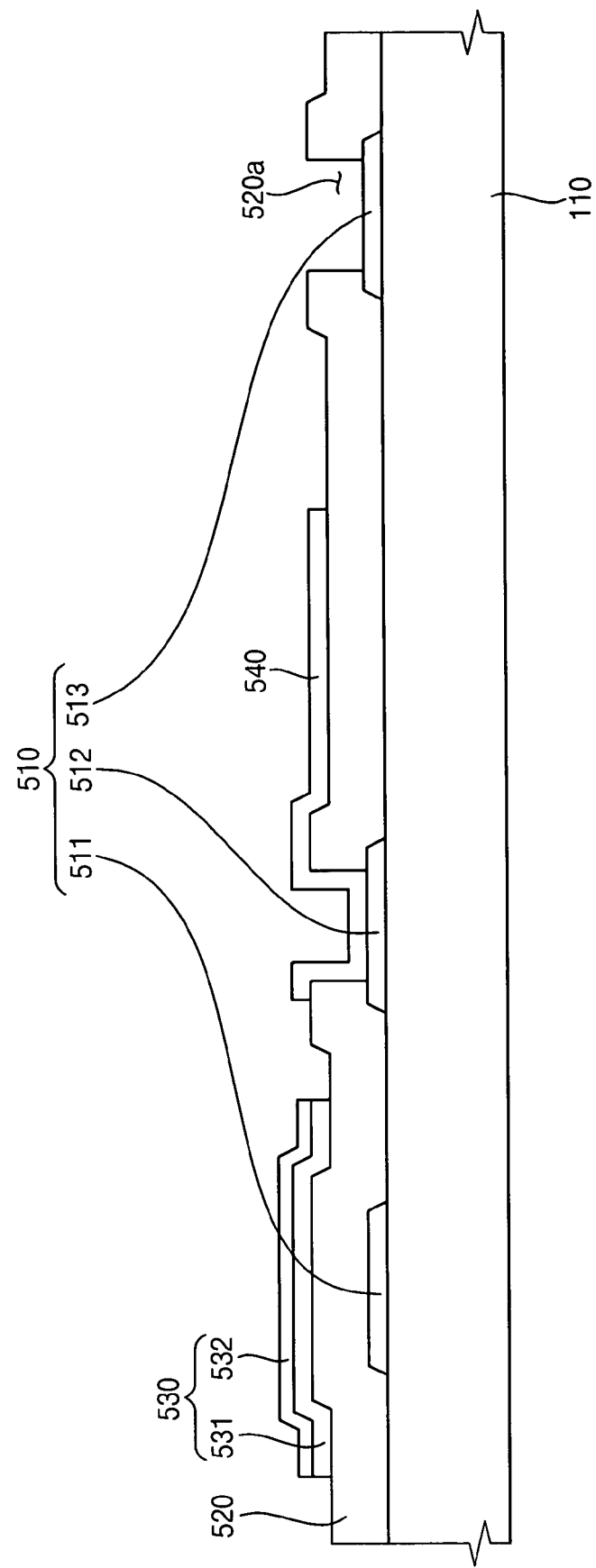
Figure 6E:
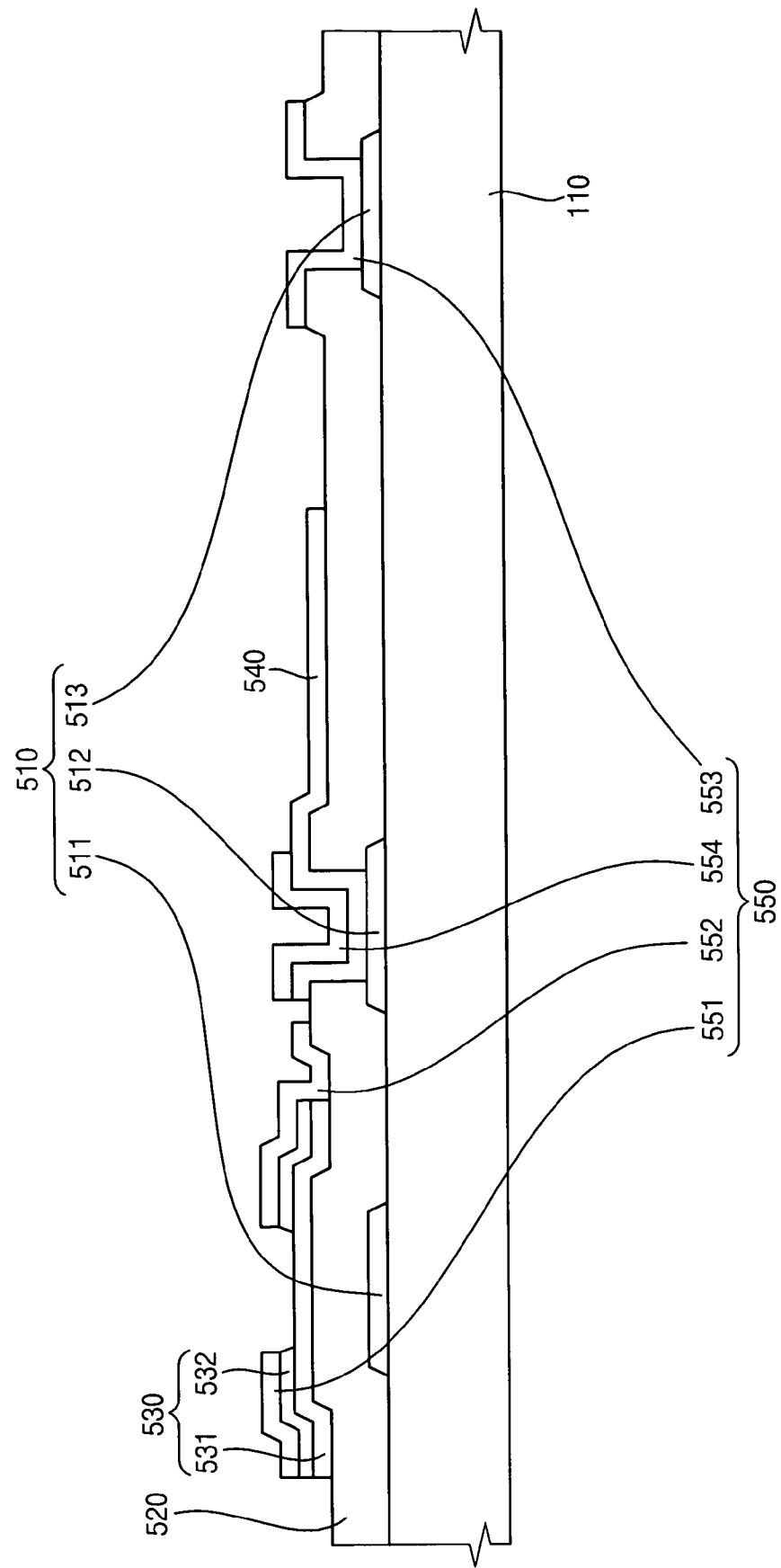
Figure 6G:
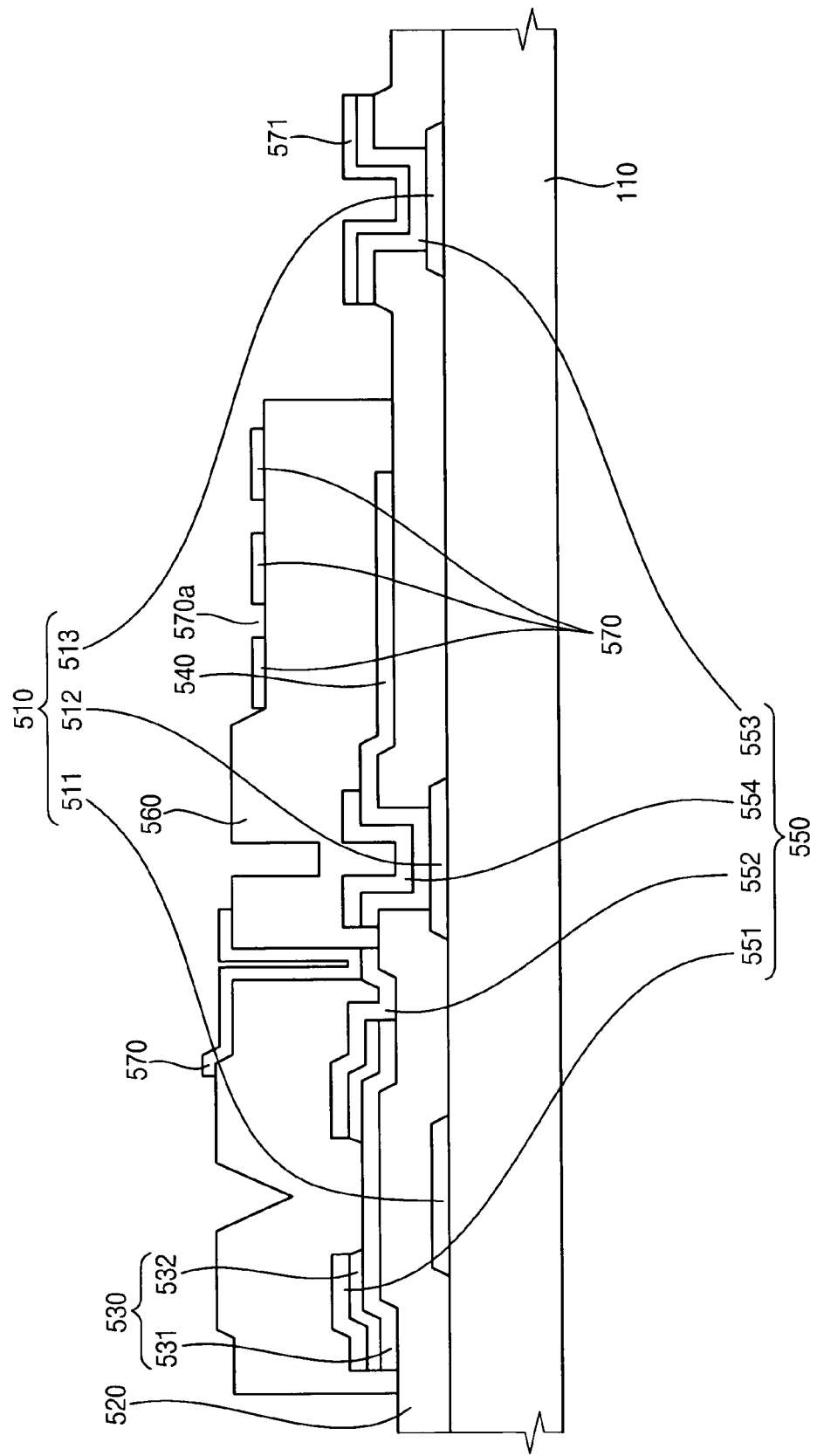

Referring to FIGS. 5 to 6G, each of the unit pixels 400 of the display substrate includes a substrate 110, a gate pattern 510, a gate insulation layer 520, a semiconductor pattern 530, a common electrode 540, a source pattern 550, a passivation layer 560 and a pixel electrode 570.

As illustrated in FIG. 6A, the gate pattern 510 is formed on the substrate 110. The gate pattern 510 includes a gate electrode 511, a reference voltage applying line 512 and a gate pad 513.

As illustrated FIG. 6B, the gate insulation layer 520 is formed on the substrate 110 having the gate pattern 510 formed thereon. The gate insulation layer 520 may include, for example, silicon nitride (SiNx), silicon oxide (SiOx), or the like. The gate insulation layer 520 has a first contact hole 520a exposing the gate pad 513 and a second contact hole 520b exposing the reference voltage applying line 512.

As illustrated in FIG. 6C, the semiconductor pattern 530 is formed on the gate insulation layer 520. The semiconductor pattern 530 is disposed over the gate electrode 511. The semiconductor pattern 530 includes an activation pattern 531 and an ohmic contact pattern 532. The activation pattern 531 may include, for example, amorphous silicon, and the ohmic contact pattern 532 may include, for example, amorphous silicon with an n-type dopant in a high concentration.

As illustrated in FIG. 6D, the common electrode 540 is formed on the gate insulation layer 520. The common electrode 540 includes an optically transparent and electrically conductive material, for example, indium tin oxide (ITO), indium zinc oxide (IZO), amorphous indium tin oxide (a-ITO), or the like.

As illustrated in FIG. 6E, the source pattern 550 is formed on the substrate 110 on which the semiconductor pattern 530 was formed. The source pattern 550 includes a source electrode 551, a drain electrode 552, a first cover pattern 553 and a second cover pattern 554. The source electrode 551 and the drain electrode 552 are separated from each other, and disposed over on the semiconductor pattern 530. The area of the ohmic contact pattern 532 between the source and drain electrodes 551 and 552 is removed, so that the activation pattern 531 is exposed between the source and drain electrodes 551 and 552. The second cover pattern 554 electrically connects the common electrode 540 to the reference voltage applying line 512 through the second contact hole 520b. The common electrode 540 may be directly connected to the reference voltage applying line 512 through the second contact hole 520b.

As illustrated in FIG. 6F, the passivation layer 560 is formed on the substrate 110 on which the source pattern 550 was formed. The passivation layer 560 has a third contact hole 560a exposing a portion of the drain electrode 552. The passivation layer 560 may include, for example, silicon nitride (SiNx), silicon oxide (SiOx), or the like.

As illustrated in FIG. 6G, the pixel electrode 570 is formed on the passivation layer 560. The pixel electrode 570 includes an optically transparent and electrically conductive material, such as ITO, IZO, a-ITO, or the like.

The pixel electrode 570 has a plurality of openings 570a therethrough. As described above, the openings 570a are formed such that the openings 570a are inclined with respect to the source line and symmetric with respect to a virtual line substantially parallel with the source line and passing through the center of the pixel electrode 570.

An alignment layer (not illustrated) for initially aligning liquid crystal molecules may be formed on the pixel electrode 570. The rubbing directions of two regions of the alignment layer disposed on opposite sides of the foregoing virtual line are oriented opposite to each other and substantially parallel with the source line.

As discussed above, the result of this arrangement is that, when no pixel voltage is applied to the pixel electrode 570, liquid crystal molecules making contact with the alignment layer are aligned along the two respective alignment film rubbing directions. However, when a pixel voltage is applied to the pixel electrode 570, the liquid crystal molecules rotate along a fringe electric field passing through the openings 570a.

Thus, when the rubbing directions of the alignment layer are oriented opposite to each other on opposite sides of the virtual line substantially parallel with the source line and passing through the center of the pixel electrode 570 as described above, the viewing angle of the unit pixel, and hence, the entire LCD, is enhanced.

An exemplary method for manufacturing the above display substrate is described below in connection with FIGS. 6A to 7G.

In FIG. 6A, a first metal layer (not illustrated) is formed on the substrate 110. The first metal layer may include, for example, chromium (Cr), aluminum (Al), tantalum (Ta), molybdenum (Mo), titanium (Ti), tungsten (W), copper (Cu), silver (Ag) and alloys thereof. The first metal layer may be formed through, for example, a sputtering method. The first metal layer may have two layers of different physical and chemical characteristics.

A photoresist film (not illustrated) is formed on the first metal layer. The photoresist film may include a positive type photoresist in which exposed regions are dissolved by a developer.

The photoresist film is then patterned to form a photoresist pattern using a mask, and the first metal layer is in turn patterned using the photoresist film as a mask to form the gate line, the gate electrode 511 protruding from the gate line, the reference voltage applying line 512 and the gate pad 513.

Figure 7A:
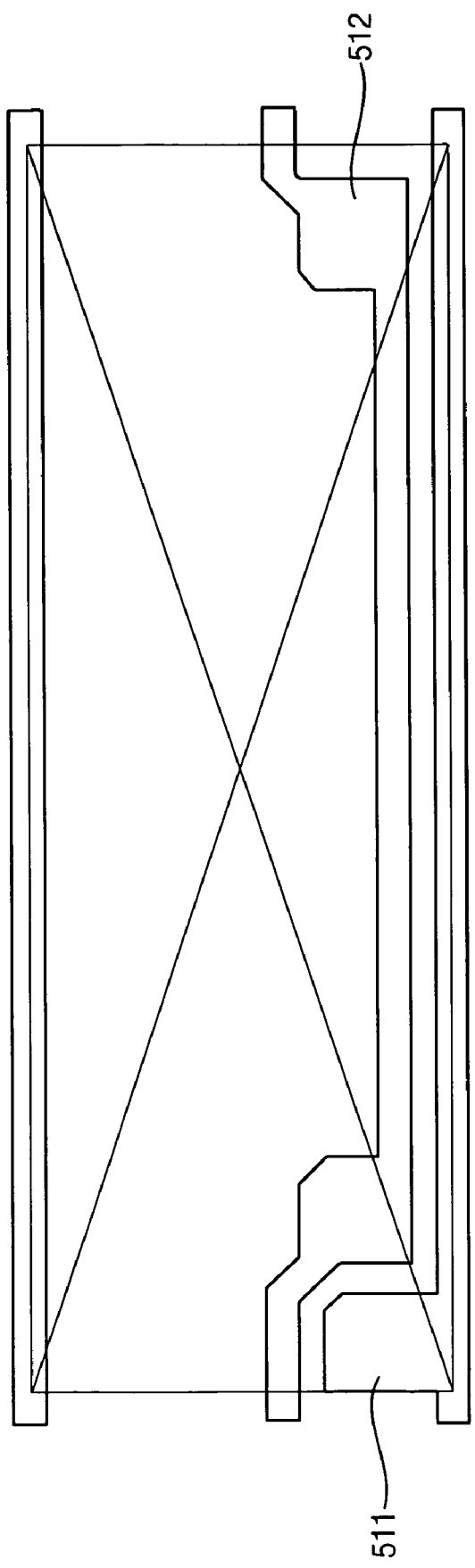
Figure 7B:
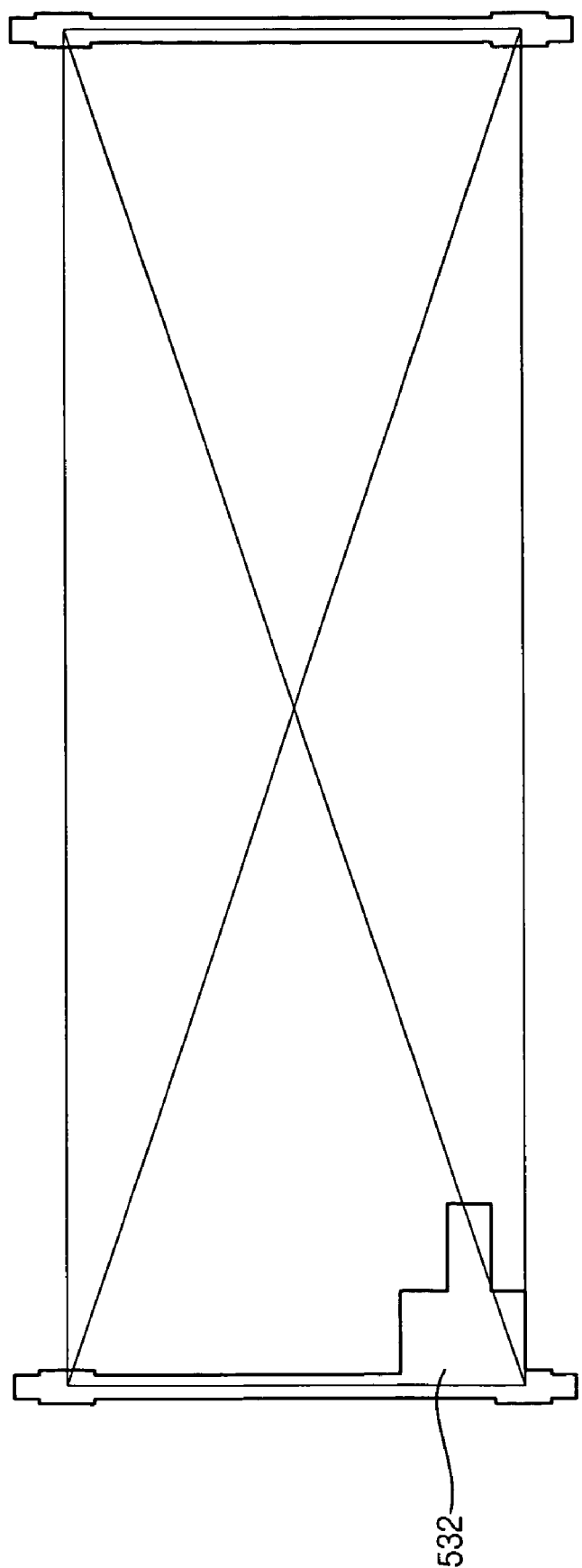
Figure 7C:
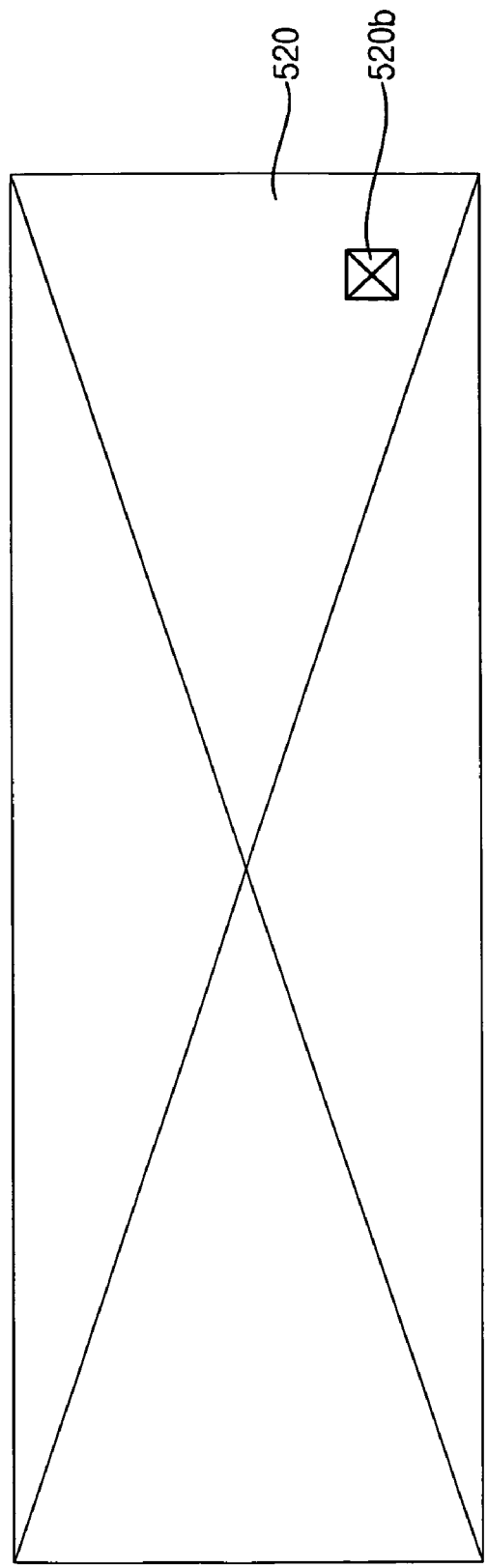

Referring to FIGS. 6B, 7B and 7C, the gate insulation layer 520 is formed on the substrate 110 on which the gate line, the gate electrode 511 protruding from the gate line, the reference voltage applying line 512 and the gate pad 513 were formed. The gate insulation layer 520 may be formed through, for example, a chemical vapor deposition (CVD) method. The gate insulation layer 520 may include, for example, silicon nitride (SiNx), silicon oxide (SiOx), or the like. The gate insulation layer 520 may have multi-layered structure, each layer being formed through a different process and having different characteristics than the others.

An activation layer (not illustrated) and an ohmic contact layer (not illustrated) are then sequentially formed on the gate insulation layer 520 through, for example, the CVD method.

The activation layer may include, for example, amorphous silicon, and the ohmic contact layer may include, for example, amorphous silicon having an n-type dopant in a high concentration.

A photoresist pattern is then formed through a photolithography method, and the activation pattern 531 and the ohmic contact pattern 532 are formed using the photoresist pattern.

Referring to FIG. 6C, the first contact hole 520a exposing the gate pad 513 and the second contact hole 520b exposing the reference voltage applying line 512 are formed through the gate insulation layer 520.

Referring to FIGS. 6D and 7D, an optically transparent and electrically conductive layer (not illustrated), including ITO, IZO, a-ITO, or the like, is formed on the gate insulation layer 520. The optically transparent and electrically conductive layer may be formed through, e.g., a sputtering method.

A photoresist film is formed on the optically transparent and electrically conductive layer. The photoresist film may include a positive type photoresist in which exposed regions are dissolved by a developer. The photoresist film is exposed and developed to form a photoresist pattern. Using the photoresist pattern as a mask, the optically transparent and electrically conductive layer is patterned to form the common electrode 540.

Figure 7E:
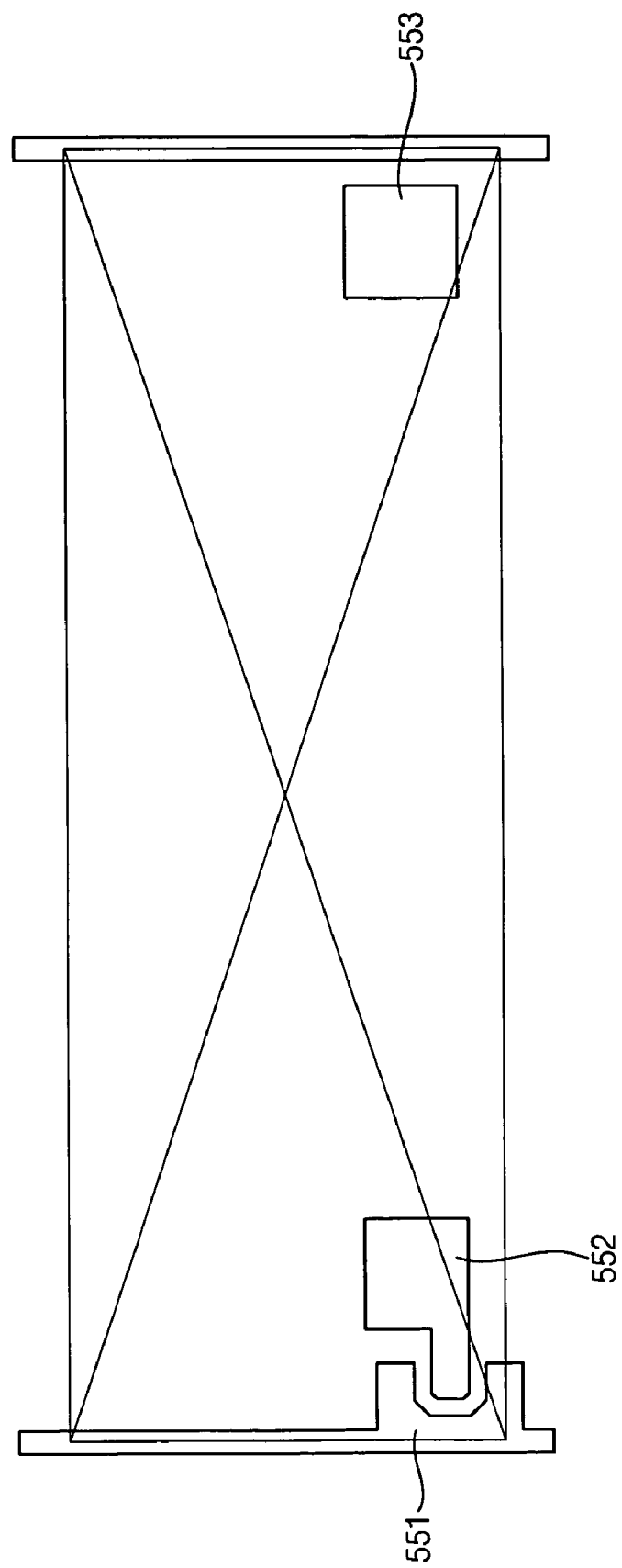

Referring to FIGS. 6E and 7E, a second metal layer (not illustrated) is formed on the substrate 110 on which the activation pattern 531 and the ohmic contact pattern 532 were previously formed. The second metal layer may include, for example, chromium (Cr), aluminum (Al), tantalum (Ta), molybdenum (Mo), titanium (Ti), tungsten (W), copper (Cu), silver (Ag) and alloys thereof. The first metal layer may be formed through, for example, a sputtering method. The first metal layer may include two layers, each having different physical and chemical characteristics.

A photoresist film is then formed on the second metal layer, and the photoresist film is patterned to form a photoresist pattern through a photolithography method. Using the photoresist pattern as a mask, the second metal layer is patterned to form the source line, the source electrode 551, the drain electrode 552, the first cover pattern 553 and a second cover pattern 554.

The source electrode 551 is formed so as to protrude from the source line, and a portion of the source electrode 551 overlaps the ohmic contact pattern 532. The drain electrode 552 is separated from the source electrode 551, and a portion of the drain electrode 552 overlaps the ohmic contact pattern 532.

The first cover pattern 553 covers the gate pad 513 exposed through first contact hole 520a. The first cover pattern 553 extends along a side face of the first contact hole 520a to cover an upper portion of the gate insulation layer 520.

The second cover pattern 554 electrically connects the common electrode 540 to the reference voltage applying line 512 through the second contact hole 520b, so that a reference voltage is applied to the common electrode 540 through the reference voltage applying line 512.

The ohmic contact pattern 532 formed between the source and drain electrodes 551 and 552 is removed to expose the activation pattern 531 using the source and drain electrodes 551 and 552 as a mask.

Figure 7F:
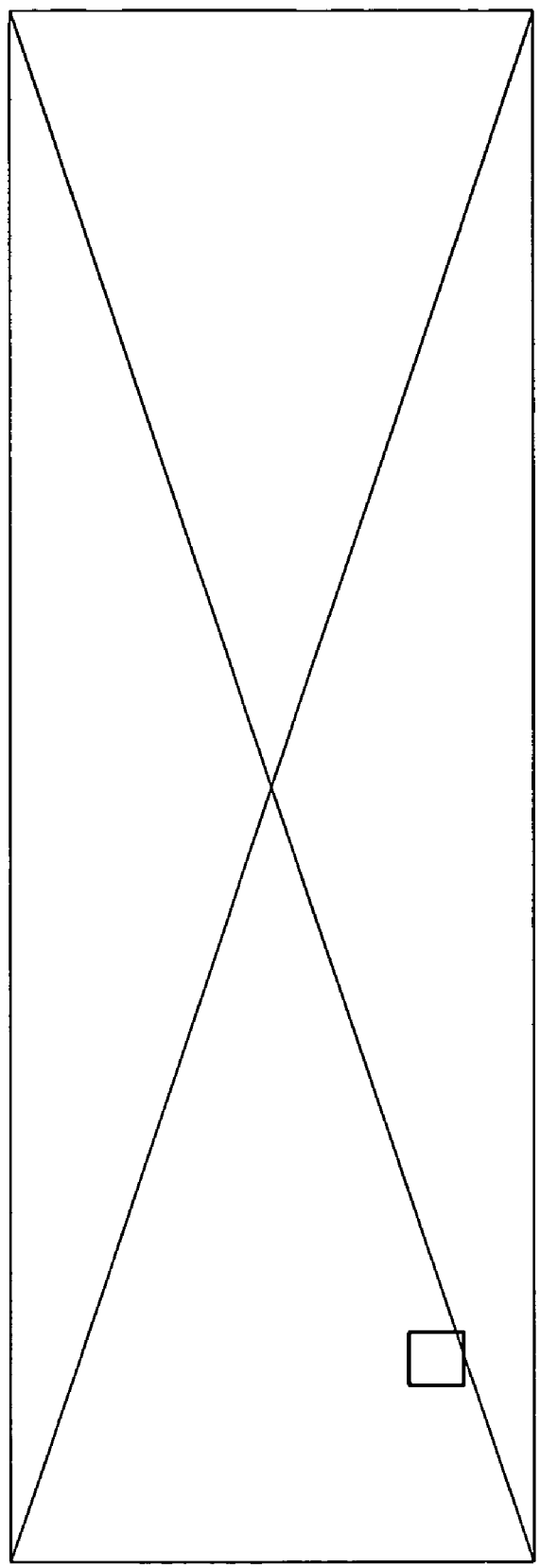

Referring to FIGS. 6F and 7F, the passivation layer 560 is formed on the substrate 110 on which a switching element, defined by the source electrode 551, the drain electrode 552, the semiconductor pattern 530 and the gate electrode 511, was formed. The passivation layer 560 may include, for example, silicon nitride (SiNx), silicon oxide (SiOx), or the like. The passivation layer may be formed through the CVD method.

A photoresist film is then formed on the passivation layer 560, and the photoresist film is patterned using a photolithography method to form a photoresist pattern. Using the photoresist pattern as a mask, the third contact hole 560a exposing a portion of the drain electrode 552, and another hole (not illustrated) exposing an end portion of the data line, are formed.

Figure 7G:
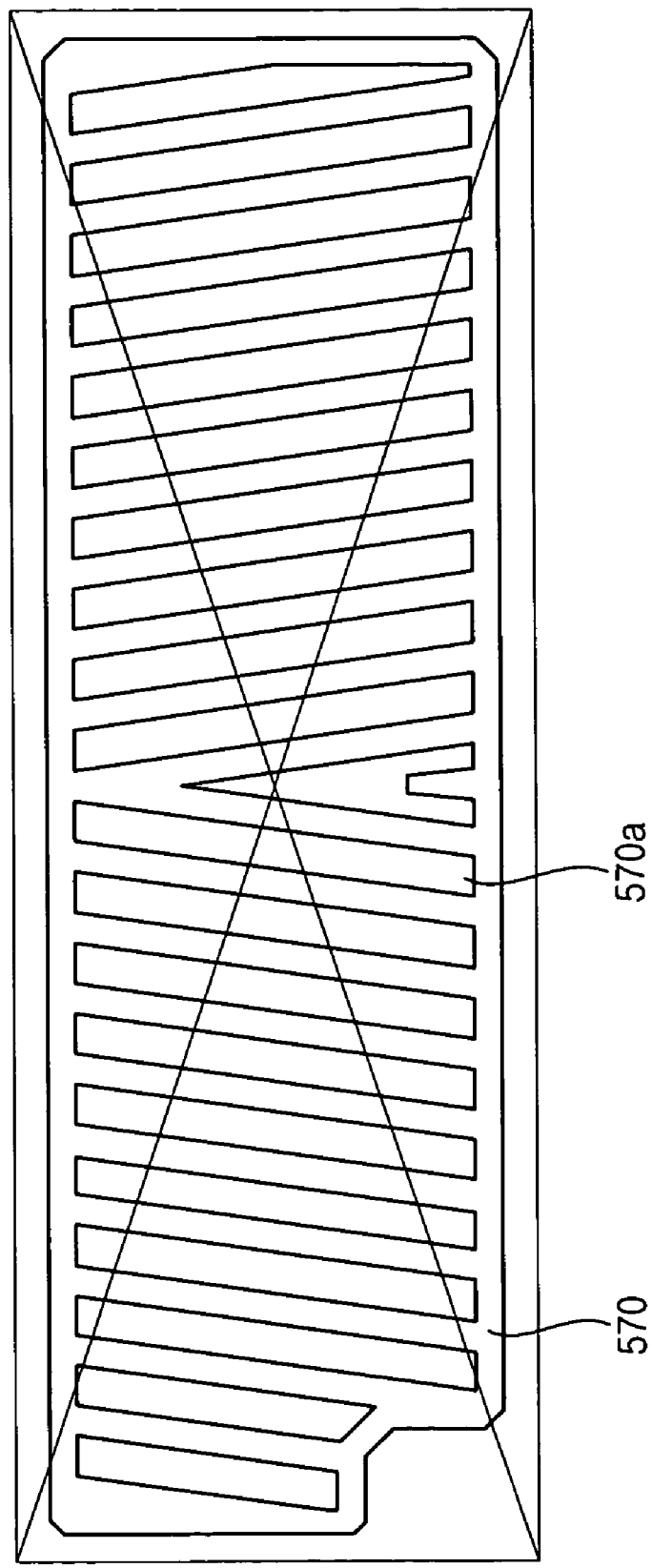

Referring to FIGS. 6G and 7G, a pixel electrode layer (not illustrated) is formed on the passivation layer 560. The pixel electrode layer includes, for example, ITO, IZO, a-ITO, or the like. The pixel electrode layer may be formed through a sputtering method.

The pixel electrode layer is then patterned through a photolithography method to form the pixel electrode 570.

The pixel electrode 570 is formed to include a plurality of openings 570a. The openings 570a are formed such that the openings 570a are inclined with respect to the source line and symmetric with respect to a virtual line substantially parallel with the source line and passing through the center of the pixel electrode 570.

Additionally, the third cover pattern 571 covering the first cover pattern 553 may be formed through the same method used to form the pixel electrode.

The exemplary display substrates described above are examples of structures for reducing the number of source drivers and in which fringe-field switching (FFS) modes are merged. Examples of display substrate structures for reducing light leakage are described below in connection with FIGS. 8 and 9.

Figure 8:
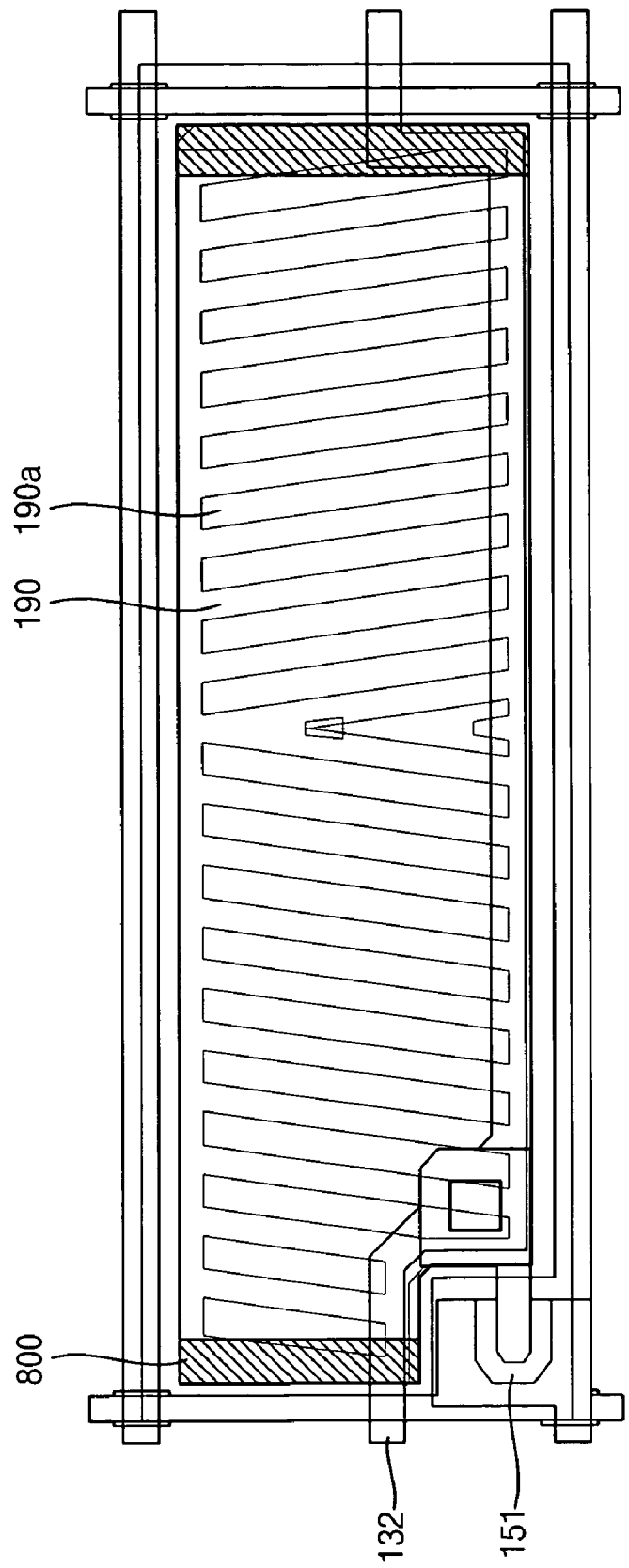
FIG. 8 is a top plan view of yet another exemplary embodiment of an LCD display substrate in accordance with the present invention, showing an exemplary unit pixel thereof; and, FIG. 9 is a partial cross-sectional view of an LCD incorporating the exemplary display substrate of FIG. 8.
Figure 9:
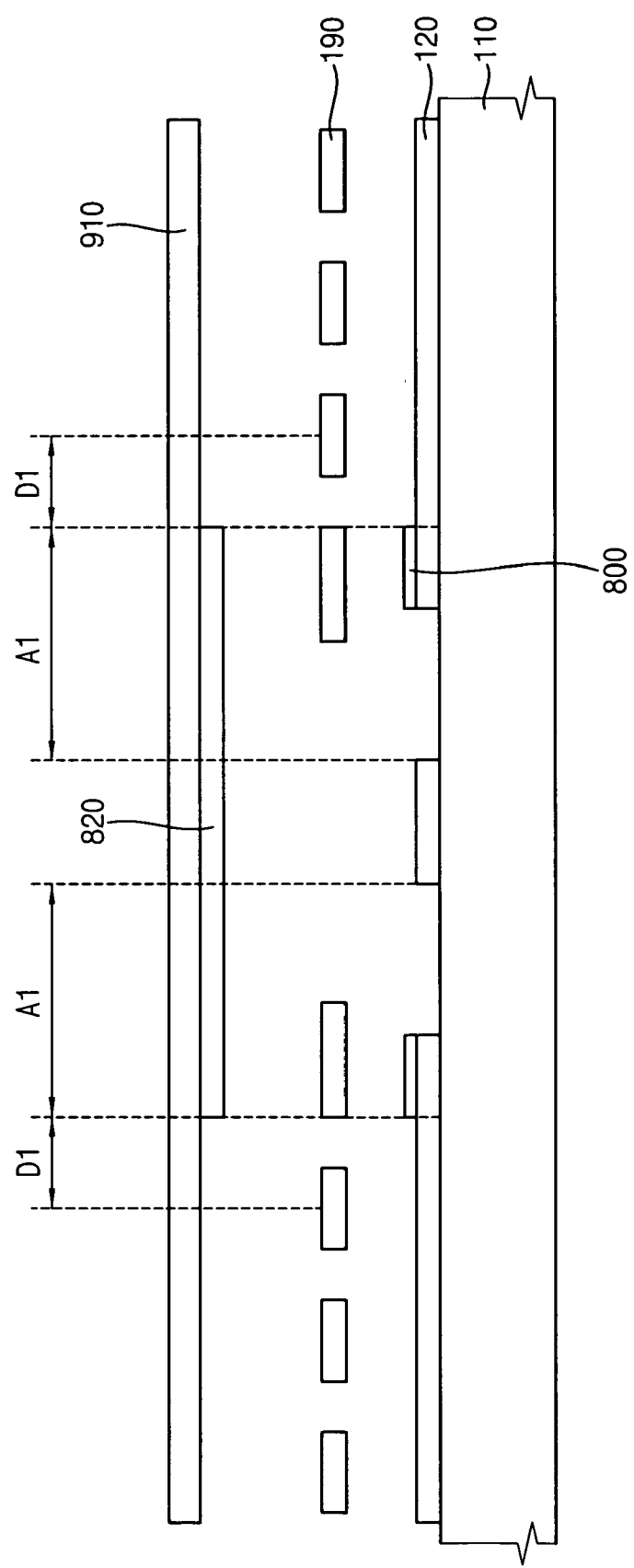

FIG. 8 is a top plan view of yet another exemplary embodiment of an LCD display substrate in accordance with the present invention, showing an exemplary unit pixel thereof, and FIG. 9 is a partial cross-sectional view of an LCD incorporating the exemplary display substrate of FIG. 8.

The exemplary display substrate of FIGS. 8 and 9 is substantially similar to that of FIG. 2, except for the additional presence of a light-blocking pattern 800. Thus, the same reference numerals are used to refer to the same or like elements as those described above in connection with the embodiment of FIG. 2, and further detailed description of these elements is omitted for brevity.

Additionally, it should be understood that the light-blocking pattern described below may also be applied to the exemplary display substrate of FIG. 5, and indeed, to any conventional display substrate employing the FFS mode.

Referring to FIGS. 8 and 9, a display substrate and an LCD according to the present embodiment may further include a light-blocking pattern 800. The light-blocking pattern 800 may be formed directly on the common electrode 120.

In the exemplary embodiment of FIG. 8, the rubbing directions of left and right sides of the alignment layer with respect to the center of the pixel electrode are oriented opposite to each other, as described above, and the rubbing directions are parallel to a direction of a short side of the pixel electrode (or a longitudinal direction of the source line).

In the above embodiment, light typically leaks through left and right end portions of the pixel electrode. To prevent such light leakage, the light-blocking pattern 800 is formed directly on the common electrode 120 corresponding to the left and right end portions of the pixel electrode, as illustrated in FIG. 8.

When the light-blocking pattern 800 is applied to the display substrate of FIG. 5, the light-blocking pattern is formed directly on the common electrode 540 corresponding to the left and right end portions of the pixel electrode, since light leaks through the left and right end portions of the pixel electrode.

In a conventional LCD display substrate, three unit pixels use the same gate line in common, but use respective, separate source lines. Further, in a conventional substrate, a short side of each of the unit pixels is substantially parallel with the gate line, three unit pixels are arranged along the gate line and rubbing directions of the alignment layer are substantially parallel with the gate line. When the light-blocking pattern is applied to the conventional display substrate, the light-blocking pattern is formed at upper and lower end portions of the unit pixels adjacent to the gate line, because light leaks through the upper and lower end portions of the unit pixels.

When the alignment layer (not illustrated) that is rubbed is formed, liquid crystal molecules adjacent to wirings that are substantially parallel with the rubbing direction are tilted. When the liquid crystal molecules are tilted, light may leak through a region D1 that is adjacent to wirings parallel with the rubbing direction, and extended along a widthwise direction of the wirings by about 8 μm, as illustrated in FIG. 9.

In order to prevent this light leakage, a width of a black matrix that is formed on an upper insulation substrate 910 may be extended into the region D1. However, when the black matrix is extended into the region D1, the aperture ratio of the display is decreased.

According to the present embodiment, however, the light-blocking pattern is formed directly on the common electrode 120. Therefore, even though the light-blocking pattern is not extended into the region D1, the light-blocking pattern nevertheless is effective to block diffracted light. As a result, the aperture ratio of the display is enhanced. The light-blocking pattern may be formed, for example, on the common electrode corresponding to end portions of the pixel electrode. However, the light-blocking pattern may also be formed on the common electrode corresponding to any region through which light leaks.

According to the exemplary embodiments described herein, the viewing angle of an LCD is widened, the number of source driver chips is reduced, and the aperture ratio of the display is enhanced.

As those of skill in this art will by now appreciate, many modifications, substitutions and variations can be made in the materials, methods and implementations of the LCD substrates and methods for manufacturing them of the present invention without departing from its spirit and scope. In light of this, the scope of the present invention should not be limited to that of the particular embodiments illustrated and described herein, as they are only by way of examples thereof, but instead, should be fully commensurate with that of the claims appended hereafter and their functional equivalents.

What is claimed is:

1. A display substrate, comprising:
   a pixel, including first, second, and third unit pixels, each generating a different color;
   first, second, and third gate lines respectively connected to the first, second and third unit pixels; and,
   a source line electrically connected to each of the first, second, and third unit pixels, wherein each of the first, second and third unit pixels comprises:
   a common electrode formed on the substrate;
   a pixel electrode disposed over and facing the common electrode such that the pixel electrode faces the common electrode, the pixel electrode having a plurality of openings therethrough;
   a light blocking pattern formed directly on the common electrode such that the light-blocking pattern covers a portion of the common electrode, and
   a reference voltage applying line formed on the substrate and electrically connected to the common electrode.

2. The display substrate of claim 1, wherein short sides of the first, second and third unit pixels are substantially parallel with the source line, and the first, second and third unit pixels are arranged along the source line.

3. The display substrate of claim 2, wherein the openings of each of the pixel electrodes are inclined with respect to the source line and symmetric with respect to a virtual line passing through the center of the pixel electrode.

4. The display substrate of claim 1, wherein the light-blocking pattern is formed at opposite end portions of the common electrode.

5. The display substrate of claim 1, wherein the common electrode is formed directly on the substrate.

6. The display substrate of claim 1, further comprising:
   a gate insulation layer formed on the substrate;
   a semiconductor pattern formed on the gate insulation layer;
   a source electrode protruding from the source line and disposed on the semiconductor pattern;
   a drain electrode disposed on the semiconductor pattern such that the drain electrode faces the source electrode; and,
   a passivation layer formed between the gate insulation layer and the pixel electrode such that the passivation layer covers the semiconductor layer, the source electrode and the drain electrode.

7. The display substrate of claim 1, further comprising:
   a gate insulation layer formed on the substrate so as to cover the first, second, and third gate lines and the reference voltage applying line.

8. The display substrate of claim 7, further comprising:
   a semiconductor layer formed on the gate insulation layer;
   a source electrode protruding from the source line and disposed on the semiconductor layer;

a drain electrode disposed on the semiconductor layer such that the drain electrode faces the source electrode; and, a passivation layer formed between the gate insulation layer and the pixel electrode such that the passivation layer covers the semiconductor layer, the source electrode, the drain electrode and the common electrode.

9. A display substrate comprising:

a substrate;

a gate line extended along a first direction on the substrate;

a source line extended along a second direction on the substrate substantially perpendicular to the first direction to define a unit pixel;

a switching element, including a gate electrode electrically connected to the gate line, a source electrode electrically connected to the source line, and a drain electrode;

a common electrode formed the unit pixel a light-blocking pattern formed directly on the common electrode to cover a portion of the common electrode;

a reference voltage applying line formed on the substrate and electrically connected to the common electrode; and, a pixel electrode disposed over the common electrode such that the pixel electrode faces the common electrode, the pixel electrode being electrically connected to the drain electrode of the switching element and having a plurality of openings therethrough.

10. The display substrate of claim 9, further comprising an alignment layer formed on the pixel electrode, the light-blocking pattern being formed such that the light-blocking pattern is disposed adjacent to the gate line and the source line, the alignment layer having a rubbing direction substantially parallel the source line.

11. A liquid crystal display (LCD), comprising:

a display substrate, comprising:

a first substrate;

a second substrate facing the first substrate, the second substrate comprising:

a gate line extended along a first direction;

a source line extended along a second direction substantially perpendicular to the first direction to define a unit pixel;

a switching element including a gate electrode electrically connected to the gate line, a source electrode electrically connected to the source line, and a drain electrode;

a common electrode formed in the unit pixel;

a light-blocking pattern formed directly on the common electrode to cover a portion of the common electrode;

a reference voltage applying line formed on the substrate and electrically connected to the common electrode;

a pixel electrode disposed over the common electrode such that the pixel electrode faces the common electrode, the pixel electrode being electrically connected to the drain electrode of the switching element, the pixel electrode having a plurality of openings therethrough; and, a layer of liquid crystal material disposed between the first and second substrates.

12. A method of manufacturing a display substrate that includes a pixel having first, second and third unit pixels and first, second and third gate lines respectively connected to the first, second and third unit pixels, the method comprising:

forming a common electrode on a substrate forming a light-blocking pattern formed directly on the common electrode; and forming a pixel electrode over the common electrode such that the pixel electrode faces the common electrode, the pixel having a plurality of openings therethrough; and forming a reference voltage applying line on the substrate such that the reference voltage applying line is electrically connected to the common electrode.

13. The method of claim 12, wherein the display substrate further comprises a reference voltage applying line, and further comprising:

forming a metal layer on the substrate; and, patterning the metal layer to form the first, second and third gate lines and the reference voltage applying lines.

14. The method of claim 13, further comprising:

forming a semiconductor pattern on a gate insulation layer;

forming a source electrode protruding from the source line and a drain electrode disposed adjacent to the source electrode on the semiconductor pattern; and, forming a passivation layer between the gate insulation layer and the pixel electrode such that the passivation layer covers the semiconductor layer, the source electrode, the drain electrode and the common electrode.

15. The method of claim 13 further comprising forming a gate insulation layer on the substrate, the common electrode being formed on the gate insulation layer.

16. The method of claim 12, wherein the reference voltage applying line and the first, second, and the third gate lines are formed by:

forming a metal layer on the substrate having the common electrode formed thereon; and, patterning the metal layer to form the reference voltage applying line and the first, second and third gate lines.

17. The method of claim 12, further comprising:

forming a gate insulation layer on the substrate;

forming a semiconductor pattern on the gate insulation layer;

forming a source electrode protruding from the source line and a drain electrode disposed adjacent to the source electrode on the semiconductor layer; and, forming a passivation layer between the gate insulation layer and the pixel electrode, the passivation layer covering the semiconductor layer, the source and drain electrodes.

* * * * *